US007949186B2

(12) United States Patent
Grauman et al.

(10) Patent No.: US 7,949,186 B2
(45) Date of Patent: May 24, 2011

(54) PYRAMID MATCH KERNEL AND RELATED TECHNIQUES

(75) Inventors: Kristen Grauman, Austin, TX (US); Trevor Darrell, Dover, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1013 days.

(21) Appl. No.: 11/724,571

(22) Filed: Mar. 15, 2007

(65) Prior Publication Data

US 2007/0217676 A1 Sep. 20, 2007

Related U.S. Application Data

(60) Provisional application No. 60/782,388, filed on Mar. 15, 2006.

(51) Int. Cl.
*G06K 9/00* (2006.01)
*G06K 9/46* (2006.01)
*G06K 9/62* (2006.01)
*G06K 9/66* (2006.01)

(52) U.S. Cl. ......... 382/170; 382/168; 382/159; 382/190

(58) Field of Classification Search ........................ None
See application file for complete search history.

(56) References Cited

U.S. PATENT DOCUMENTS

| 6,373,979 | B1* | 4/2002 | Wang | 382/165 |
|---|---|---|---|---|
| 6,711,287 | B1* | 3/2004 | Iwasaki | 382/165 |
| 6,782,395 | B2* | 8/2004 | Labelle | 1/1 |
| 7,328,111 | B2* | 2/2008 | Porikli | 702/19 |
| 7,627,178 | B2* | 12/2009 | Suzuki et al. | 382/190 |
| 2004/0090453 | A1* | 5/2004 | Jasinschi et al. | 345/723 |
| 2004/0228526 | A9* | 11/2004 | Lin et al. | 382/165 |
| 2007/0101268 | A1* | 5/2007 | Hua et al. | 715/721 |
| 2007/0110306 | A1* | 5/2007 | Ling et al. | 382/168 |

OTHER PUBLICATIONS

Swain et al. "Color Indexing", International Journal of Computer Vision, 1991.*
Engel, Joachim "The Multiresolution Histogram", Metrika, 1997, v46, 41-57.*
Christian Wallraven, Barbara Caputo, Arnulf Graf, Recognition with Local Features: The Kernel Recipe, Oct. 2003, In Proceedings IEEE International Conference on Computer Vision, Nice, France.

(Continued)

*Primary Examiner* — Samir A Ahmed
*Assistant Examiner* — Li Liu
(74) *Attorney, Agent, or Firm* — Daly, Crowley, Mofford&Durkee, LLP

(57) ABSTRACT

A method for classifying or comparing objects includes detecting points of interest within two objects, computing feature descriptors at said points of interest, forming a multi-resolution histogram over feature descriptors for each object and computing a weighted intersection of multi-resolution histogram for each object. An alternative embodiment includes a method for matching objects by defining a plurality of bins for multi-resolution histograms having various levels and a plurality of cluster groups, each group having a center, for each point of interest, calculating a bin index, a bin count and a maximal distance to the bin center and providing a path vector indicative of the bins chosen at each level. Still another embodiment includes a method for matching objects comprising creating a set of feature vectors for each object of interest, mapping each set of feature vectors to a single high-dimensional vector to create an embedding vector and encoding each embedding vector with a binary hash string.

9 Claims, 17 Drawing Sheets

OTHER PUBLICATIONS

Josef Sivic, Andrew Zisserman, Video Google: A Text Retrieval Approach to Object Matching in Videos, Apr. 2003, pp. 1-8, 2 Volume Set, Computer Society.

Lior Wolf, Amnon Shashua, Learning Over Sets Using Kernel Principal Angels, Oct. 2003, pp. 913-931, Journal of Machine Learning Research 4, Lior Wolf and Amnon Shashua.

John Lafferty, Guy Lebanon, Information Diffusion Kernels, Dec. 2002,, pp. 1-8, In Advances in Neural Information Processing, Vancouver, Canada.

David G. Lowe, Distinctive Image Features from Scale-Invariant Keypoints, Jan. 5, 2004, pp. 1-28, International Journal of Computer Vision,.

Thomas Gartner, A Survey of Kernels for Structured Data, Jul. 2003, pp. 1-10, Department of Computer Science, University of Bristol, United Kingdom, Department of Computer Science III, University of Bonn, Germany.

R. Fergus, P. Perona, A. Zisserman, Object Class Recognition by Unsupervised Scale-Invariant Learning, 2003, pp. 1-8, University of Oxford, Oxford, United Kingdom, California Institute of Technology, Pasadena, California.

Serge Belongie, Jitendra Malik, Jan Puzicha, Shape Matching and Object Recognition Using Shape Contexts, Aug. 14, 2001, pp. 509-522, In Proceedings IEEE Transactions on Pattern Analysis and Machine Intelligence, vol. 24, No. 24, Apr. 2002.

Risi Kondor, Tony Jebara, A Kernel Between Sets of Vectors, 2003, pp. 1-8, Computer Science Department, Columbia University M.C. New York.

* cited by examiner

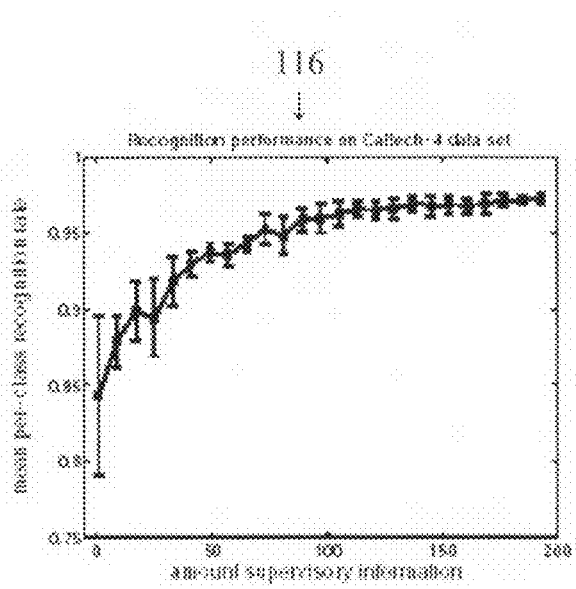
Fig. 16
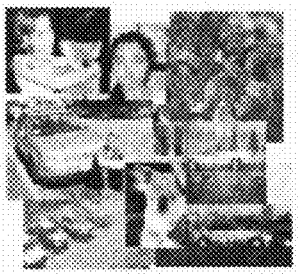
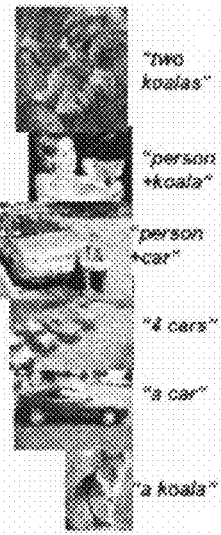
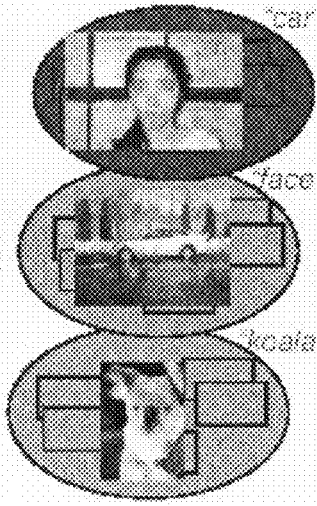
Fig. 17

| Pyramid matching method | Mean recognition rate/class (d=128 / d=10) | Time/match (s) (d=128 / d=10) |
|---|---|---|
| Vocabulary-guided bins | 99.0 / 97.7 | 6.1e-4 / 6.2e-4 |
| Uniform bins | 64.9 / 96.5 | 1.5e-3 / 5.7e-4 |

200
↓

Given: Database of images $\{X_1,...,X_N\}$ each with feature vectors $$X_j = \{x_1,...,x_{m_j}\}, x_i \in R^d:$$

Step 201: *for all sets $X_j$, $j = 1,...,N$ do*

Step 202: Compute embedding: Compute sparse multi resolution histogram $\Psi(X_j)$ and then weighted vector $f(X_j)$, represented sparsely as $\{(I,V)l\}_{l=1}^{Z}$ a list of $d$-dim. nonzero indices $I_l$ and their associated weighted counts $V_l$, with $Z = O(m_jL)$.

Step 203: Compute hash key:

Step 204: for all Hash functions $\vec{r}_i, i = 1, ..., k$ do

Step 205: Generate next hash key bit:

$$h_{\vec{r}_i}(f(X_j)) = \begin{cases} 1, & if \sum_{l=1}^{z} \vec{r}_i^{(l)} \sqrt{V_l} \geq 0 \\ 0, & otherwise \end{cases}$$

where $\vec{r}_i^{(l)} \sim N(0,1)$ is the $\tau_l^{th}$ entry in random vector $\vec{r}_i$,
generated via seeds relative to $i$ and $l$.

Step 206: end for

Step 207: Concatenate $k$ bits to form binary hash key:

$$[h_{\vec{r}_1}(f(X_j)),...,h_{\vec{r}_k}(f(X_j))]$$

Step 208: end for

Step 209: Process hash keys for Hamming space approximate-NN search according to Charikar:

generate $M = O(N^{1/(1+\epsilon)})$ random $k$-dimensional permutations, permute all database
hash keys by each one, and sort each list of permuted keys.

Given: Query image represented by set of features $Q$,

Step 210: Compute embedding $f(Q)$ and hash key $[h_{\vec{r}_1}(f(Q)),...,h_{\vec{r}_k}(f(Q))]$ as in
step 202 and 203 above.

Step 211: Apply each permutation to query hash key bits.

Step 212: Perform binary search on each sorted, permuted order of database hash keys,
and collect the indices $[t_1...t_{2M}]$ corresponding to the database items' hash keys
that are indexed in each.

Step 213: Sort hashed examples according to $P_\Delta(\Psi(Q),\Psi(X_{t_i}))$, for $i = 1,...,2M$.

Fig. 25

PYRAMID MATCH KERNEL AND RELATED TECHNIQUES

CROSS-REFERENCE TO RELATED APPLICATIONS

The present application claims the benefit of U.S. Provisional Patent Application No. 60/782,388, filed on Mar. 15, 2006, which is incorporated herein by reference.

STATEMENTS REGARDING FEDERALLY SPONSORED RESEARCH

This invention was made with Government support under Subcontract No. 03-000215 issued under Contract No. 6894769 awarded by the Defense Advanced Research Projects Agency. The Government has certain rights in this invention.

FIELD OF THE INVENTION

This invention relates generally to computer searching and retrieval systems and more particularly to systems and techniques to identify and match objects.

BACKGROUND OF THE INVENTION

When searching for relevant objects within a computer network, various techniques and algorithms have been used to locate relevant information, images or objects including techniques with sets of features, using kernels and support vector machines (SVMs) for recognition, and multi-resolution image representations.

Kernel-based learning algorithms, which include SVMs, kernel PCA (principal component analysis), and kernel LDA (linear discriminant analysis), have become well-established tools that are useful in a variety of contexts, including discriminative classification, regression, density estimation, and clustering. However, conventional kernels (such as the Gaussian RBF (radial basis function) or polynomial) are designed to operate on $R^N$ vector inputs, where each vector entry corresponds to a particular global attribute for that instance. As a result, initial approaches using SVMs for recognition were forced to rely on global image features, i.e. ordered features of equal length measured from the image as a whole, such as color or grayscale histograms or vectors of raw pixel data. Such global representations are known to be sensitive to real-world imaging conditions, such as occlusions, pose changes, or image noise.

More recently, it has been shown that local features invariant to common image transformations are a powerful representation for recognition, because the features can be reliably detected and matched across instances of the same object or scene under different viewpoints, poses or lighting conditions. Most approaches, however, perform recognition with local feature representations using nearest neighbor or voting-based classifiers followed by an alignment step. Both may be impractical for large training sets, since their classification times increase with the number of training examples. A support vector classifier or regressor, on the other hand, identifies a sparse subset of the training examples (the support vectors) to delineate a decision boundary or approximate function of interest.

In order to more fully leverage existing kernel-based learning tools for situations where the data cannot be naturally represented by a Euclidean vector space, such as graphs, strings, or trees, researchers have developed specialized similarity measures. Due to the increasing prevalence of data that is best represented by sets of local features, several researchers have recently designed kernel functions that can handle unordered sets as input. Nonetheless, current approaches are either prohibitively computationally expensive, make impractical assumptions regarding the parametric form of the features, discard information by replacing inputs with prototypical features, ignore semantically important co-occurrence information by considering features independently, are not positive-definite, and (or) are limited to sets of equal size. In addition, to our knowledge none have shown the ability to learn a real-valued function from sets of features; results have only been shown for classification tasks.

Approaches which fit a parametric model to feature sets in order to compare their distributions can be computationally costly and have limited applicability, since they assume both that features within a set will conform to the chosen distribution, and that sets will be adequately large enough to extract an accurate estimate of the distribution's parameters. These assumptions are violated regularly by real data, which will often exhibit complex variations within a single bag of features (e.g., patches from an image), and will produce wide ranges of cardinalities per instance (e.g., titles of documents have just a few word features).

Kernel methods which use explicit correspondences between two sets' features search one set for the best matching feature for each member in the other, and then define set similarity as a function over those component similarity values. These methods have complexities that are quadratic in the number of features, hindering usage for kernel-based learning when feature sets are large. Furthermore, matching each input feature independently ignores useful information about intra-set dependencies. In one known method, similarity is measured in terms of the principal angle between the linear subspaces spanned by two sets' vector elements. The kernel has a cubic complexity and is only positive-definite for sets of equal cardinality. In another known method, an algebraic kernel is used to combine similarities given by local (vector-based) kernels, with the weighting chosen to reflect whether the features are in alignment (ordered). When set cardinalities vary, inputs must be padded with zeros so as to form equal-size matrices; results are only shown for a classification task with input sets whose features' ordering is known.

An alternative approach to discriminative classification when dealing with unordered set data is to designate prototypical examples from each class, and then represent examples by a vector giving their distances to each prototype. Standard algorithms that handle vectors in a Euclidean space are then applicable. One technique is to build such a classifier for handwritten digits, and use a shape context distance as the measure of similarity. The issues faced by such a prototype-based method are determining which examples should serve as prototypes, choosing how many there should be, and updating the prototypes properly when new types of data are encountered. Another method uses a hybrid generative-discriminative approach for object recognition, combining a Fisher kernel and a probabilistic constellation model.

SUMMARY OF THE INVENTION

In accordance with the present invention, a method for classifying or comparing objects includes detecting points of interest within two objects, computing feature descriptors at said points of interest, forming a multi-resolution histogram over feature descriptors for each object and computing a weighted intersection of multi-resolution histogram for each object. With such an arrangement, an efficient object comparing technique is provided having accuracy that is comparable to that of state of the art techniques while requiring less computational time. Referring to the technique as a pyramid match kernel, the pyramid match maps unordered feature sets to multi-resolution histograms and computes a weighted histogram intersection in order to find implicit correspondences based on the finest resolution histogram cell where a matched pair first appears. It should be appreciated that in the present invention, objects may include images, text, or any other item that may be characterized by a set of features. For example, an image may be described by local features extracted from patches around salient interest points, or a shape may be described by local descriptors defined by edge pixels. In natural language processing, documents or topics may be represented by sets or bags of words. In computational biology, a disease may be characterized by sets of gene-expressions data from multiple patients. In all of the above, a set of feature vectors denotes an instance of a particular class of interest (an object, shape, document, etc.). The number of features may vary and within a single instance the component features may have no inherent ordering.

In accordance with a further aspect of the present invention, a method for matching objects comprises defining a plurality of bins for multi-resolution histograms having various levels and a plurality of cluster groups, each group having a center, for each point of interest, calculating a bin index, a bin count and a maximal distance to the bin center and providing a path vector indicative of the bins chosen at each level. With such an arrangement, a technique to compute matching between point sets that takes advantage of the underlying structure in the feature space and remains consistently accurate and efficient for high-dimensional inputs on real image data is provided.

In accordance with a further aspect of the present invention, a method for matching objects comprises creating a set of feature vectors for each image of interest, mapping each set of feature vectors to a single high-dimensional vector to create an embedding vector and encoding each embedding vector with a binary hash string. With such an arrangement, a search can be accomplished more quickly to find matching objects of interest.

BRIEF DESCRIPTION OF THE DRAWINGS

The foregoing features of this invention, as well as the invention itself, may be more fully understood from the following description of the drawings in which:

FIG. 16 is a chart showing recognition performance on unseen images using categories learned with varying amounts of weak semi-supervision;

FIG. 17 depicts an embodiment of the invention for organizing media files;

FIG. 25 shows pseudocode illustrating the steps to perform the pyramid match hashing algorithm;

DETAILED DESCRIPTION OF THE INVENTION

Figure 1:
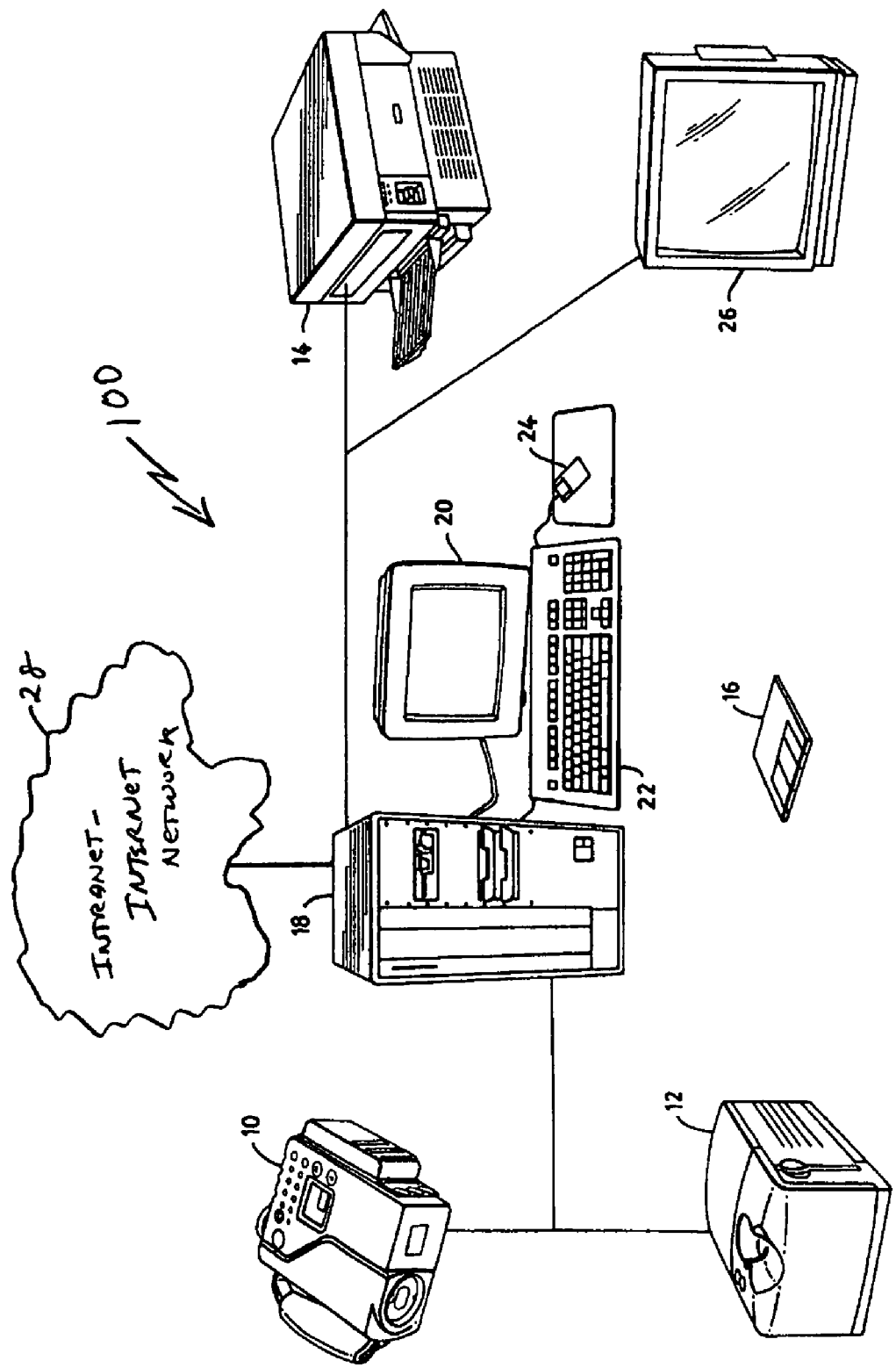
FIG. 1 is a block diagram of a preferred embodiment of an electronic computer system for implementing the current invention.

A data object recognition and computer searching and retrieval system 100 is illustrated in FIG. 1. An image signal source, such as an electronic still camera 10 or a scanner 12, provides an electronic image signal which represents an image of a subject (not shown). A computer 18 receives the electronic signal from the image signal source and thereafter processes the image signal electronically to provide any number of known image processing functions. The processed image is then transmitted, i.e. output, to a destination device or destination application such as a diskette 16, an user monitor 20, a printer 14, a remote monitor 26 or any other device or computer (not shown) connected to the network 28. Operator interaction with the system is facilitated by use of a keyboard 22 or a mouse 24. It should be noted that the components shown in FIG. 1 are exemplary rather than all inclusive of the many equivalent devices known by those skilled in the art. For instance, any image signal source could be used, such as an electronic camera, a scanner, a camcorder, a charge coupled device (CCD), a charge injected device (CID), etc. Also, the processing of the image need not necessarily occur solely in the computer 18. Indeed, various phases or aspects of the image processing could occur in the image signal source, the computer, or the destination output device.

In order to fully appreciate the claimed invention and before providing a detailed description of the invention, it may be helpful to review the concept of data object representation. In a variety of domains, it is often natural and meaningful to represent a data object with a collection of its parts or component features. For instance, in computer vision, an image may be described by local features extracted from patches around salient interest points, or a shape may be described by local descriptors defined at edge pixels. Likewise, in natural language processing, documents or topics may be represented by sets or bags of words; in computational biology, a disease may be characterized by sets of gene-expression data from multiple patients. In such cases, one set of feature vectors denotes a single instance of a particular class of interest (an object, shape, document, etc.). The number of features per example varies, and within a single instance the component features may have no inherent ordering.

Classification and regression with these sets (or bags) of features is challenging. Kernel-based learning methods are appealing for their generalization ability and efficiency; however conventional kernels are designed to operate on fixed-length vector inputs, where each vector entry corresponds to a particular global attribute for that instance. The commonly used general-purpose kernels defined on $R^N$ inputs are not applicable in the space of vector sets. Existing kernel-based approaches specially designed for matching sets of features generally require either solving for explicit correspondences between features (which is computationally costly and prohibits the use of large inputs) or fitting a particular parametric distribution to each set (which makes restrictive assumptions about the data and can also be computationally expensive).

Figure 1A:
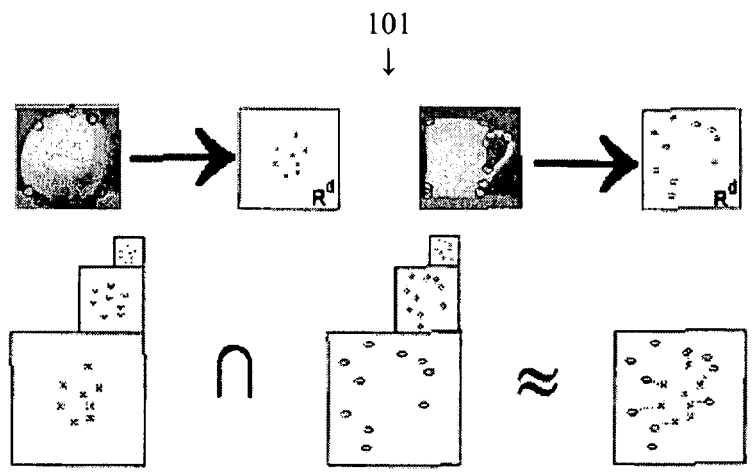
FIG. 1A is a pictorial diagram of a pyramid match kernel intersecting histogram pyramids formed over local features, approximating the optimal correspondences between the sets' features according to the invention.

We propose a pyramid match kernel, a new kernel function over unordered feature sets that allows them to be used effectively and efficiently in kernel-based learning methods. Each feature set is mapped to a multi-resolution histogram that preserves the individual features' distinctness at the finest level. The histogram pyramids are then compared using a weighted histogram intersection computation, which we show defines an implicit correspondence based on the finest resolution histogram cell where a match pair first appears. As shown in FIG. 1A, a pyramid match kernel intersects histogram pyramids 101 formed over local features, approximating the optimal correspondences between the sets' features as to be described in more detail hereinbelow. The similarity measured by the pyramid match approximates the similarity measured by the optimal correspondences between feature sets of unequal cardinality (i.e., the partial matching that optimally maps points in the lower cardinality set to some subset of the points in the larger set, such that the summed similarities between matched points is maximal). The kernel of the present invention is extremely efficient and can be computed in time that is linear in the sets' cardinality. We show that our kernel function is positive-definite, meaning that it is appropriate to use with learning methods that ensure convergence to a unique optimum only for positive-definite kernels (e.g., the support vector machine).

Because the present invention does not penalize the presence of superfluous data points, the inventive kernel is robust to clutter. As to be described, this translates into the ability to handle common issues faced by vision tasks like object recognition or pose estimation, unsegmented images, poor segmentations, varying backgrounds, and occlusions. The kernel also respects the co-occurrence relations inherent in the input sets, rather than matching features in a set individually, ignoring potential dependencies conveyed by features within one set, our similarity measure captures the features' joint statistics. Prior attempts for matching features unfortunately each suffers from some number of the following drawbacks: computational complexities that make large feature set sizes infeasible; limitations to parametric distributions which may not adequately describe the data; kernels that are not positive-definite; limitations to sets of equal size; and failure to account for dependencies within feature sets.

Our method addresses each of these issues, resulting in a kernel appropriate for comparing unordered, variable length feature sets within any existing kernel-based learning paradigm. We demonstrate our algorithm in a variety of classification and regression tasks: object recognition from sets of image patch features, 3-D human pose inference from sets of local contour features from monocular silhouettes, and documents' time of publication estimation from bags of local latent semantic features. The results show that the described approach achieves an accuracy that is comparable to that of state-of-the-art techniques, while requiring significantly less computation time.

Kernel-based learning algorithms are founded on the idea of embedding data into a Euclidean space, and then seeking linear relations among the embedded data. For example, an SVM finds the optimal separating hyperplane between two classes in an embedded space (also referred to as the feature space). A kernel function $K:X \times X \rightarrow R$ serves to map pairs of data objects in an input space, X, to their inner product in the embedding space, F, thereby evaluating the similarities between all data objects and determining their relative positions. Linear relations are sought in the embedded space, but a decision boundary may still be non-linear in the input space, depending on the choice of a feature mapping function $\Phi: X \rightarrow F$.

Our technique provides a new kernel function based on implicit correspondences that enables discriminative classification and regression for unordered, variable-sized sets of vectors, the kernel is provably positive-definite. The main advantages of our algorithm are its efficiency, its use of the joint statistics of co-occurring features, and its resistance to clutter or "superfluous" data points. The basic idea of our method is to map sets of features to multi-resolution histograms, and then compare the histograms with a weighted histogram intersection measure in order to approximate the similarity of the best partial matching between the feature sets. We refer to the described kernel as a pyramid match kernel because input sets are converted to multi-resolution histograms.

The Pyramid Match Kernel

We consider an input space X of sets (or multi-sets, since we allow duplications) of d-dimensional feature vectors that are bounded by a sphere of diameter D and whose minimum inter-vector distance is 1. Note that a particular minimum inter-vector distance may be enforced by scaling the data appropriately.

The feature extraction function $\Psi$ is defined as:

$$\Psi(x) = [H_{-1}(x), H_0(x), \ldots, H_L(x)], \quad \text{Eq. (1)}$$

where x∈X, L=⌈log₂ D⌉, $H_i(x)$ is a histogram vector formed over data x using d-dimensional bins of side length $2^i$, and $H_i(x)$ has a dimension $$r_i = \left(\frac{D}{2^i \sqrt{d}}\right)^d.$$

In other words, ψ(x) is a histogram pyramid, where each subsequent component histogram has bins that double in size (in all d dimensions) compared to the previous one. The bins in the finest-level histogram $H_{-1}$ are small enough that each d-dimensional data point from sets in X falls into its own bin, and then the bin size increases until all data points from sets in X fall into a single bin at level L.

The pyramid match kernel $K_\Delta$ measures similarity between point sets based on implicit correspondences found within this multi-resolution histogram space. The similarity between two input sets is defined as the weighted sum of the number of feature matchings found at each level of the pyramid formed by Ψ:

$$K_\Delta(\Psi(y), \Psi(z)) = \sum_{i=0}^{L} \omega_i N_i, \quad \text{Eq. (2)}$$

where $N_i$ signifies the number of newly matched pairs at level i. A new match is defined as a pair of features that were not in correspondence at any finer resolution level.

The kernel implicitly finds correspondences between point sets, if we consider two points matched once they fall into the same histogram bin, starting at the finest resolution level where each point is guaranteed to be in its own bin. The matching effects a hierarchical process: vectors not found to correspond at a high resolution have the opportunity to be matched at lower resolutions.

Figure 2:
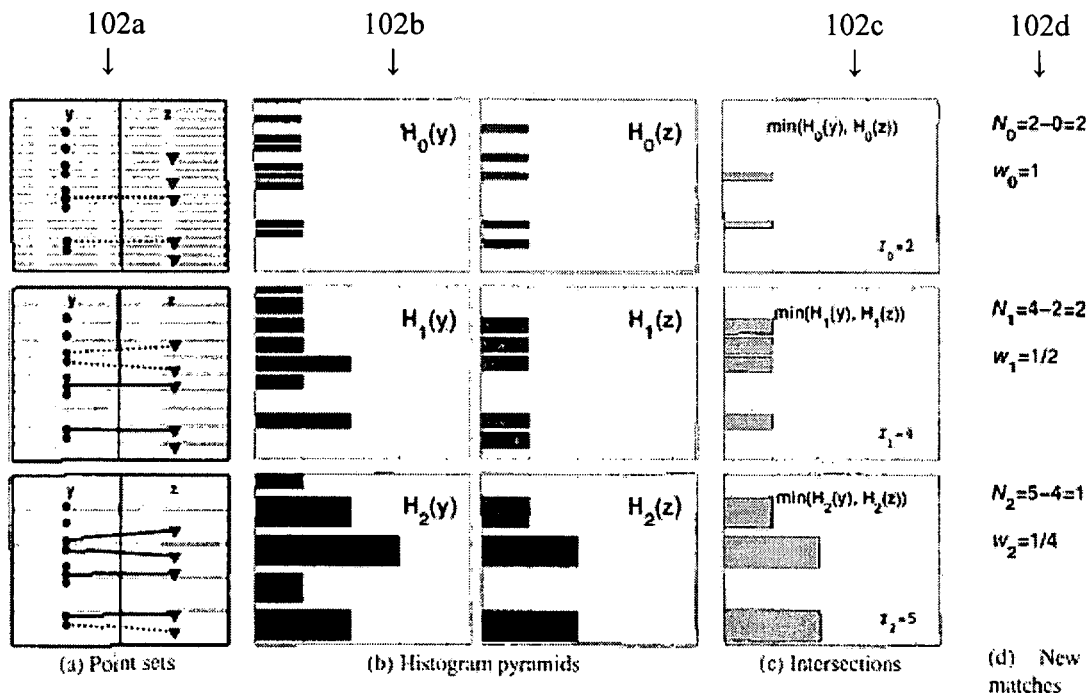
FIG. 2 is a diagram showing a pyramid match determines a partial correspondence by matching points once they fall into the same histogram bin.

Referring now to FIG. 2, a pyramid match determines a partial correspondence by matching points once they fall into the same histogram bin. In this example, two 1-D feature sets are used to form two histogram pyramids. Each row corresponds to a pyramid level. $H_{-1}$ is not pictured here because no matches are formed at the finest level. In graph 102a, the set y is on the left side, and the set z in on the right. Points are distributed along the vertical axis, and these same points are repeated at each level. Light dotted lines are bin boundaries, bold dashed lines indicate a pair matched at this level, and bold solid lines indicate a match already formed at a finer resolution level. In graph 102b, multi-resolution histograms are shown, with bin counts along the horizontal axis. In graph 102c, the intersection pyramid between the histograms in graph 102b are shown. $K_\Delta$ uses this to measure how many new matches occurred at each level. Here, $I_i=I(H_i(y), H_i(z))=2, 4, 5$ across levels, and therefore the number of new matches found at each level are $N_i=2, 2, 1$. The sum over $N_i$ weighted by $\omega_i=1, \frac{1}{2}, \frac{1}{4}$, gives the pyramid match similarity.

As shown in FIG. 2, there are two points matched at the finest scale, two new matches at the medium scale, and one at the coarsest scale. $K_\Delta$'s output value reflects the overall similarity of the matching. Each newly matched pairs at level i contributes a value $\omega_i$ that is proportional to how similar two points matching at that level must be, as determined by the bin size. The sum in Equation 2 starts with index $N_i$ because the definition of Ψ insures that no points match at level i=−1.

To calculate $N_i$, the kernel makes use of a histogram intersection function I, which measures the "overlap" between two histograms' bins:

$$I(A, B) = \sum_{j=1}^{r} \min(A^{(j)}, B^{(j)}), \quad \text{Eq. (3)}$$

where A and B are histograms with r bins, and $A^{(j)}$ denotes the count of the $j^{th}$ bin of A.

Histogram intersection effectively counts the number of points in two sets which match at a given quantizational level, i.e., fall into the same bin. To calculate the number of newly matched pairs $N_i$ induced at level i, it is sufficient to compute the difference between successive histogram levels' intersections:

$$N_i = I(H_i(y), H_i(z)) - I(H_{i-1}(y), H_{i-1}(z)), \quad \text{Eq. (4)}$$

were $H_i$ refers to the $i^{th}$ component histogram generated by Ψ in Equation 1. Note that the kernel is not searching explicitly for similar points. It never computes distances between the vectors in each set. Instead, it simply uses the change in intersection values at each histogram level to count the matches as they occur.

The number of new matches found at each level in the pyramid is weighted according to the size of that histogram's bins: matches made within larger bins are weighted less than those found in smaller bins. Since the largest diagonal of a d-dimensional hypercube bin with sides of length 2 has length $2^i\sqrt{d}$, the maximal distance between any two points in one bin doubles at each increasingly coarser histogram in the pyramid. Thus, the number of new matches induced at level i is weighted by $\frac{1}{2^i}$ to reflect the (worst-case) similarity of points matched at that level. This means that similarity between vectors (features in y and z) at finer resolution, where features are more distinct, is rewarded more heavily than similarity between vectors at a courser level.

From Equations 2, 3, and 4, we define the (un-normalized) pyramid match kernel function:

$$\overline{K}_\Delta(\Psi(y), \Psi(z)) = \sum_{i=0}^{L} \frac{1}{2^i}(I(H_i(y), H_i(z)) - I(H_{i-1}(y), H_{i-1}(z))) \quad \text{Eq. (5)}$$

where y, z∈X, and $H_i(x)$ is the $i^{th}$ histogram in Ψ(x). We normalize this value by the product of each input's self-similarity to avoid favoring larger input sets, arriving at the final kernel value $$K_\Delta(P, Q) = \frac{1}{\sqrt{C}} \overline{K}_\Delta(P, Q),$$

where $C=K_\Delta(P,P)K_\Delta(Q,Q)$.

In order to alleviate quantization effects that may arise due to the discrete histogram bias, we can combine the kernel values resulting from multiple (T) pyramid matches formed under different multi-resolution histograms with randomly shifted bins. Each dimension of each of the T pyramids is shifted by an amount chosen uniformly at random between 0 and D. This yields T feature mappings $\Psi_1, \ldots, \Psi_T$ that are applied as in Equation 1 to map an input set y to T multi-resolution histograms: $[\Psi_1(y), \ldots, \Psi_T(y)]$. For inputs y and z, the combined kernel value is then $$\sum_{j=1}^{T} K_{\Delta}(\Psi_j(y), \Psi_j(z)).$$

Partial Match Correspondences

The kernel of the present invention allows sets of unequal cardinalities, and therefore it enables partial matching, where the points of the smaller set are mapped to some subset of the points in the larger set. Dissimilarity is only judged on the most similar part of the empirical distributions, and superfluous data points are ignored. The result is a robust similarity measure that accommodates inputs expected to contain extraneous vector entries. This is a common situation when recognizing objects in images, due for instance to background variations, clutter, or changes in object pose that cause different subsets of features to be visible. Thus, the proposed kernel is equipped to handle unsegmented or poorly segmented examples, as we will describe hereinbelow.

By construction, the pyramid match offers an approximation of the optimal correspondence based matching between two feature sets, in which the overall similarity between corresponding points is maximized. When input sets have equal cardinalities, histogram intersection can be reduced to an $L_1$ distance:

$$I(H(y), H(z)) = m - \frac{1}{2}\|H(y) - H(z)\|_{L1}, \quad \text{Eq. (6)}$$

if $$m = |y| = |z|.$$

Intersection over the pyramid with weights set to $w_i = \frac{1}{2^i}$ then strictly approximates the optimal bipartite matching. With variable cardinalities no similar proof is available, but we show empirically below that the intersection of multi-resolution histograms approximates the best partial matching both in simulation and in practice.

Since the pyramid match defines correspondences across entire sets simultaneously, it inherently accounts for the distribution of features occurring in one set. In contrast, previous approaches have used each feature in a set to independently index into the second set. This ignores possibly useful information that is inherent in the co-occurrence of a set of distinctive features, and it fails to distinguish between instances where an object has varying numbers of similar features since multiple features may be matched to a single feature in the other set.

Satisfying Mercer's Condition

Only positive semi-definite kernels guarantee an optimal solution to kernel-based algorithms based on convex optimization, which includes SVMs. According to Mercer's theorem, a kernel K is positive semi-definite if and only if $$K(x_i, x_j) = \langle \Phi(x_i) \Phi(x_j) \rangle, \forall x_1, x_j \in X, \quad \text{Eq. (7)}$$

where $\langle \cdot \rangle$ denotes a scalar dot product. This insures that the kernel corresponds to an inner product in some feature space, where kernel methods can search for linear relations.

Histogram intersection on single resolution histograms over multi-dimensional data is a positive-definite similarity function. Using this construct and the closure properties of valid kernel functions, we can show that the pyramid match kernel is a Mercer kernel. The definition given in Equation 5 is algebraically equivalent to:

$$K_{\Delta}(\Psi(y), \Psi(z)) = \frac{\min(|y|, |z|)}{2^L} + \sum_{i=0}^{L-1} \frac{1}{2^{i+1}} I(H_i(y), H_i(z)) \quad \text{Eq. (8)}$$

since $I(H_{-1}(Y), H_{-1}(z))=0$ and $I(H_L(y), H_L(z))=\min(|y|,|z|)$ by the construction of the pyramid. Given that Mercer kernels are closed under both addition and scaling by a positive constant, we only need to show that the minimum cardinality between two sets $\min(|y|,|z|)$ corresponds to a positive semi-definite kernel.

The cardinality of an input set x can be encoded as a binary vector containing [x] ones followed by Z−[x] zeros, where Z is the maximum cardinality of any set. The inner product between two such expansions is equivalent to the cardinality of the smaller set, thus satisfying Mercer's condition. Note that this binary expansion and others only serve to prove positive-definiteness and are never computed explicitly. Therefore, $K_{\Delta}$ is valid for use in existing learning methods that require Mercer kernels.

Efficiency

The time required to compute $\Psi$ for an input set with m d-dimensional features is $O(dz \log D)$, where $z=\max(m, k)$ and k is the maximum feature value in a single dimension. Typically $m>k$. The bin coordinates corresponding to non-zero histogram entries for each of the $\lceil \log_2 D \rceil$ quantization levels are computed directly during a scan of the m input vectors. These entries are sorted by the bin indices and the bin counts for all entries with the same index are summed to form one entry. This sorting requires only $O(dm+kd)$ time using the radix-sort algorithm, a linear time sorting algorithm that is applicable to the integer bin indices. The histogram pyramid that results is high-dimensional, but very sparse, with only $O(m \log D)$ non-zero entries that need to be stored.

The complexity of $K_{\Delta}$ is $O(dm \log D)$, since computing the intersection values for histograms that have been sorted by bin index requires time linear in the number of non-zero entries (not the number of actual bins). Generating multiple pyramid matches with randomly shifted grids simply scales the complexity by T, the constant number of shifts. All together, the complexity of computing both the pyramids and kernel values is $O(Tdm \log D)$. In contrast, current approaches have polynomial dependence on the number of features, which limits the practicality of large input sizes.

Classification and Regression with the Pyramid Match

Support vector machines and support vector regressors (SVRs) are trained to perform classification and regression with the pyramid match kernel. An SVM or SVR is trained by specifying the matrix of kernel values between all pairs of training examples. The kernel's similarity values determine the examples' relative positions in an embedded space, and quadratic programming is used to find the optimal separating hyperplane or function between the two classes in this space. Because the pyramid match kernel is positive-definite we are ensured to find a unique optimal solution.

We have found that the pyramid match kernel can produce kernel matrices with dominant diagonals, particularly as the dimension of the features in the sets increases. The reason for this is that as the dimension of the points increases, there are a greater number of finer-resolution histogram levels in the pyramid where two input sets will have few shared bins. Once the quantization level is course enough, two sets will start having significant histogram intersection values. However, these intersections will receive lower weights due to the $\frac{1}{2^i}$ weighting scheme, which by construction accurately reflects the maximal distance between points falling into the same bin at level i. On the other hand, an input set compared against itself will result in large histogram intersection values at each level. Specifically intersection values equal to the number of points in the set, which after normalization generates a diagonal entry of one.

The danger of having a kernel matrix diagonal that is significantly larger than the off-diagonal entries is that the examples appear nearly orthogonal in the feature space, in some cases causing an SVM or SVR to essentially "memorize" the data and impairing its sparsity and generalization ability. Nonetheless, we are able to work around this issue by modifying the initial kernel matrix in such a way that reduces its dynamic range, while preserving its positive-definiteness. We use the functional calculus transformation as taught in the article by B. Weston et al. entitled "Dealing with Large Diagonals in Kernel Matrices" published in Principals of Data Mining and Knowledge Discovery, volume 243 of SLNCE, 2002, and incorporated herein by reference. A sub-polynomial kernel is applied to the original kernel values, followed by an empirical kernel mapping that embeds the distance measure into a feature space. Thus, when necessary to reduce diagonal dominance, first kernel values $K_{ij}$ generated by $K_\Delta$ are updated to $K_{ij} \leftarrow K_{ij}^p$, $0<p<1$. Then the kernel matrix K is replaced with $KK^T$ to obtain the empirical feature map $\Phi_e(y)=[K(y_1,x_1), \ldots, K(y,x_N)]^T$ for N training examples. As in the above mentioned Weston article, the parameter p may be chosen with cross-validation. Note that this post-processing of the kernel matrix is not always necessary; both the dimension of the points as well as the specific structure of a given dataset will determine how dominant the initial kernel matrix diagonal is.

Approximate Partial Matchings

As described above, the pyramid match approximates the optimal correspondence-based matching between two feature sets. While for the case of equal cardinalities it reduces to an $L_1$ norm in a space that is known to strictly approximate the optimal bijective matching, empirically we find the pyramid kernel approximates the optimal partial matching of unequal cardinality sets. We conducted an experiment to evaluate how close the correspondences implicitly assigned by the pyramid match are to the true optimal correspondences, the matching that results in the maximal summed similarity between corresponding points. We compared our kernel's outputs to those produced by the optimal partial matching obtained via a linear programming solution to the transportation problem. This optimal solution requires time exponential in the number of features in the worst case, although it often exhibits polynomial time behavior in practice.

Figure 3:
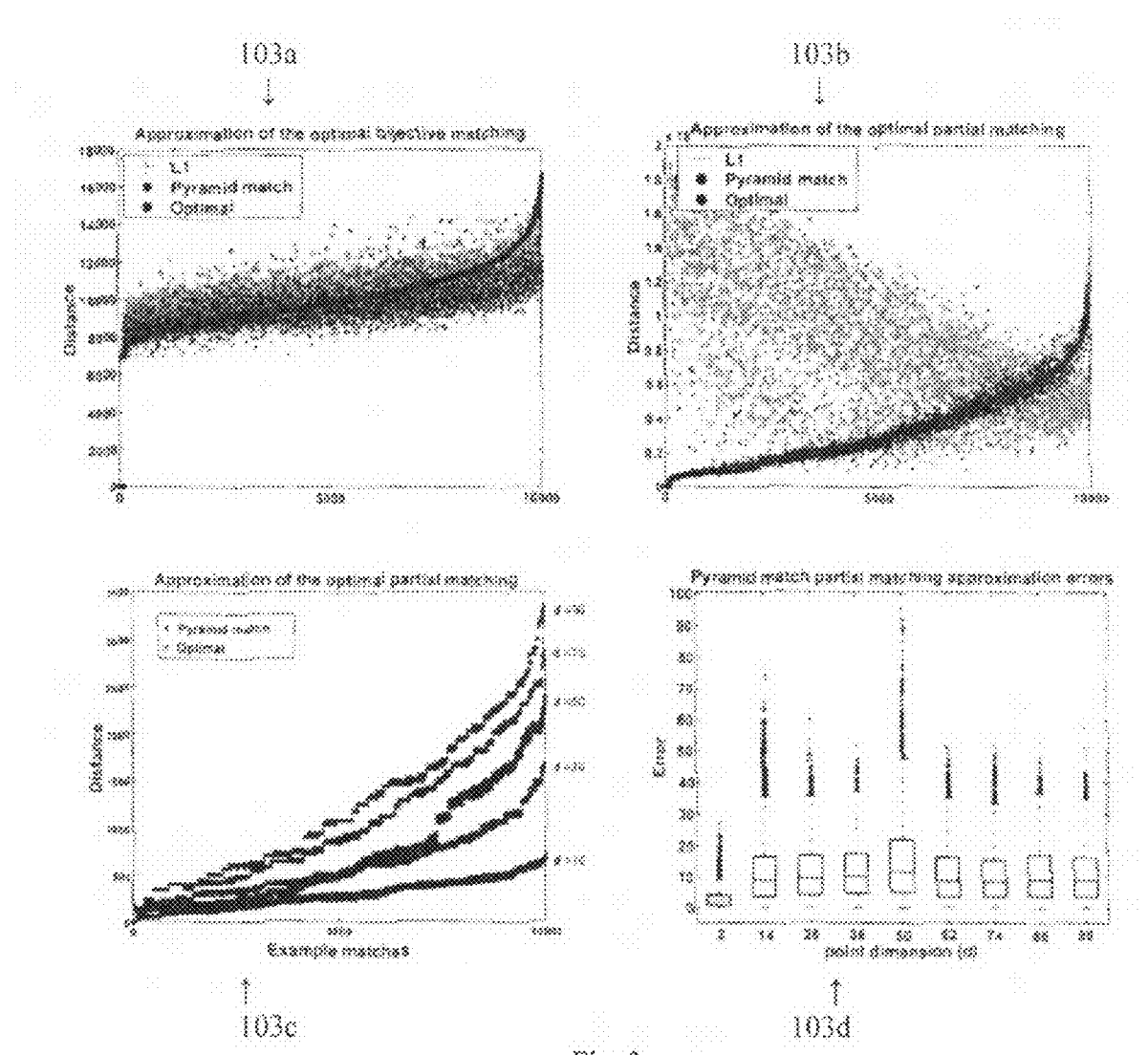
FIG. 3 is four plots showing various matching characteristics.

First, we compared the pyramid match against the optimal matching and the $L_1$ embedding of as taught by the article by Indyk and Thaper entitled "Fast Image Retrieval via Embeddings", published in 3$^{rd}$ International Workshop on Statistical and Computational Theories of Vision, Nice, France, October 2003 and incorporated herein by reference. We generated two data sets, each with 100 point sets containing 2-D points with values uniformly distributed between one and 1000. In one data set, each point set had equal cardinalities (100 points each), while in the other cardinalities varied randomly from five to 100. Referring now to FIG. 3, the top two plots 103a, 103b show the results of 10,000 pairwise set-to-set comparisons computed according to the correspondences produced by the optimal matching, the pyramid match with T=1, and the $L_1$ embedding, respectively, for each of these sets. Note that in these figures we plot distance (inverse similarity), and the values are sorted according to the optimal measure's magnitudes for visualization purposes. To transform the pyramid match similarity values to distances, we simply altered the weights to their inverses ($w_i=2^i$).

FIG. 3 shows that our method does indeed find matchings that are consistently on par with the optimal solution. In the equal cardinality case (plot on top left), both the pyramid match and the $L_1$ embedding produce good approximations; both are on average less than 9% away from the optimal measure. However, more importantly, the pyramid match can also approximate the partial matching for the unequal cardinality case (plot on top right). Its matchings continue to follow the optimal matching's trend since it does not penalize outliers, whereas the $L_1$ embedding fails because it requires all points to match to something. Our method is again on average less than 9% away from the optimal matching's measure for the unequal cardinality case, while the $L_1$ matching has an average error of 400%.

To further evaluate how well the pyramid match's approximation ability scales with data dimension, we ran additional experiments as above for values of d ranging from two to 98 and compared the pyramid match against the optimal matching. These results are summarized by the two plots 103c, 103d in the bottom row of FIG. 3. The plot 103c on the bottom left shows the results of 10,000 pairwise set-to-set comparisons computed according to the correspondences produced by the optimal matching and the pyramid match with T=1 for sets with varying cardinalities and d={10, 30, 50, 70, 90} (labels on right).

The plot 103d on the bottom right shows the error distributions for increasing point dimensions, with error measured as the absolute value between the outputs of the optimal matching and the pyramid match. We find that the distortion (approximation error) of the pyramid match seems to level off and remain steady for higher dimensions.

It should now be appreciated as shown in FIG. 3, the pyramid match approximates the optimal correspondences, even for sets of unequal cardinalities. The two plots 103a, 103b in the top row compare the pyramid match against both the optimal matching and an $L_1$ metric embedding for point sets of equal sizes (top left) and point sets of varying sizes (top right). The two plots 103c, 103d in the bottom row demonstrate the pyramid match's ability to approximate the optimal matching for higher dimensions with an example match comparisons (bottom left) and error distributions for increasing point dimensions (bottom right). Error distributions are displayed with boxplots: the lines in the center of the boxes denote the median value, the top and bottom of boxes denote upper and lower quartile values, and the dashed lines show the extent of the rest of the errors.

To further understand how well the pyramid match approximates an optimal correspondence, we conducted additional experiments to evaluate how close the correspondences implicitly measured by the pyramid match are to the true optimal correspondences, i.e. the matching that results in the minimal summed cost between corresponding points. In order to work with realistic data but still have control over the sizes of the sets and the amount of clutter features, we established synthetic "category" models. Each model is comprised of some fixed number m' of parts, and each part has a Gaussian model that generates its d-dimensional appearance vector (in the spirit of the "constellation model" used by Fergus et al. 2003 and others). Given these category models, we can then add clutter features, adjust noise parameters, and so on, simulating in a controlled manner the variations that occur with the sets of image patches extracted from an actual object. The appearance of the clutter features is determined by selecting a random vector from a uniform distribution on the same range of values as the model features.

We generated two data sets, one with equally-sized sets, and one with variable-sized sets. Every point set was drawn from one of two synthetic category models, with m'=35 and d=2. For the first data set, 50 point sets containing only the m' model features were sampled from both of the two category models, for a total of 100 equally-sized point sets. For the other data set, the model feature sets were merged with a randomly generated number C of "extra" clutter features, for a total of 100 point sets with m'+C features each, with C selected uniformly at random from [0, 100]. We compared the pyramid match's outputs to those produced by the optimal partial matching obtained via a linear programming solution to the transportation problem (see the article by Rubner et al., entitled "The Earth Mover's Distance as a Metric for Image Retrievial", International Journal of Computer Vision, 40(2): 99-121, 2000), as well as those produced by an $L_1$ approximation (see Indyk and Thaper mentioned above). For both of the data sets, we computed the pairwise set-to-set distances using each of these three measures.

If an approximate measure is approximating the optimal matching well, we should find the ranking induced by that approximation to be highly correlated with the ranking produced by the optimal matching for the same data. In other words, the point sets should be sorted similarly by either method. We can display results in two ways to evaluate if this is true: 1) by plotting the actual costs computed by the optimal and approximate method, and 2) by plotting the rankings induced by the optimal and approximate method. Spearman's rank correlation coefficient R provides a good quantitative measure to evaluate the ranking consistency:

$$R = 1 - \frac{6 \sum_{i=1}^{N} (i - \hat{r}(i))^2}{N(N^2 - 1)},$$

where i is the rank value in the true order and r̂(i) is the corresponding rank assigned in the approximate ordering, for each of the N corresponding ordinal values assigned by the two measures.

Figure 4:
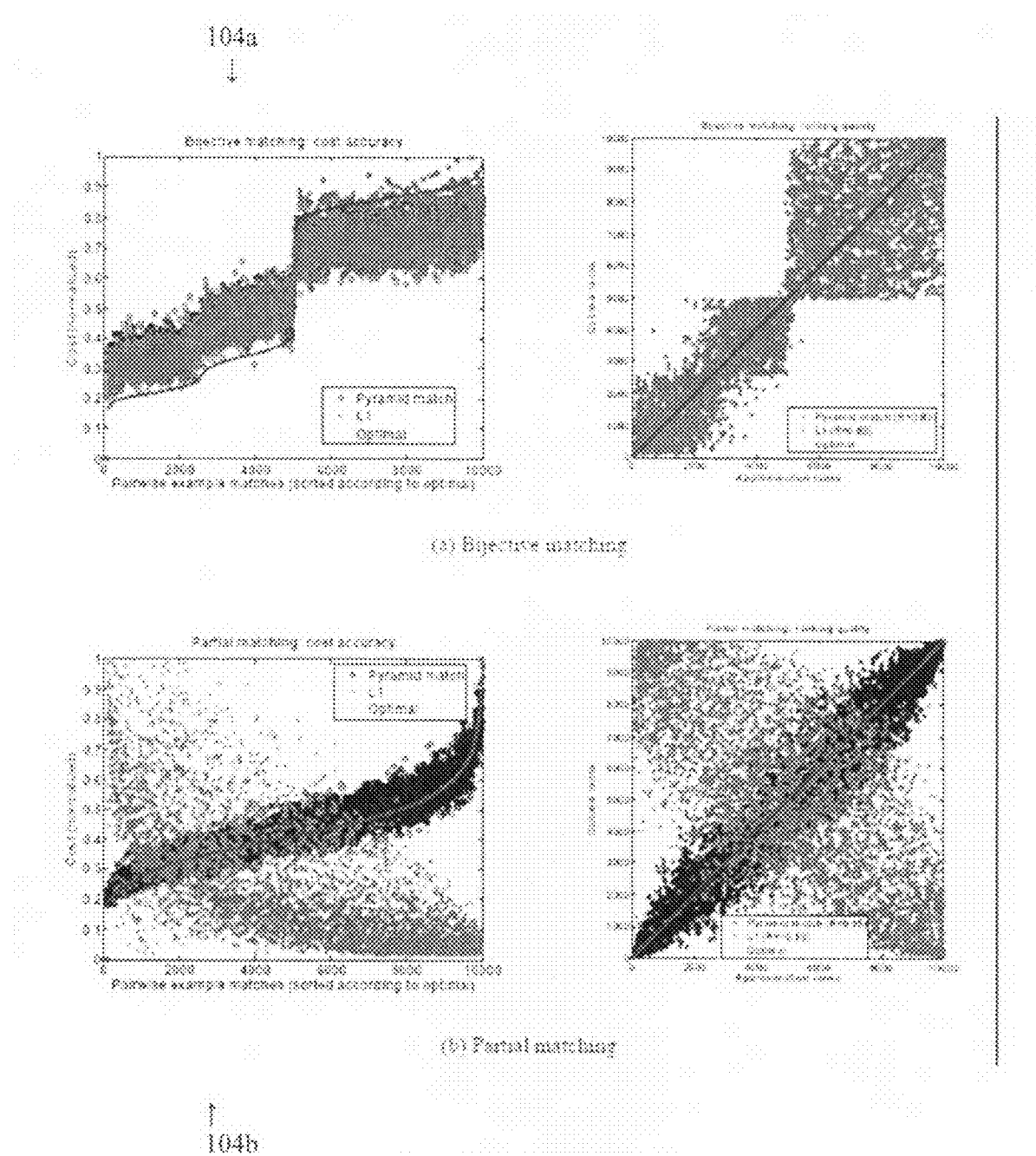
FIG. 4. shows plots of pyramid match and $L_1$ embedding comparison on bijective matchings with equally-sized sets and partial matchings with variably-sized sets.

FIG. 4 displays both types of plots for the two data sets: the top row 104a displays plots corresponding to the data set with equally-sized sets, that is, for the bijective matching problem, while the bottom row 104b displays plots corresponding to the data set with variable-sized sets, that is, for the partial matching problem.

The two plots in the left hand column show the normalized output costs from 10,000 pairwise set-to-set comparisons computed by the optimal matching, the pyramid match with the number of random shifts T=3 (circles), and the $L_1$ approximation, also with T=3 (x's). Note that in these figures we plot cost (so the pyramid match weights are set to $w_i = d2^i$), and for display purposes the costs have been normalized by the maximum cost produced for each measure to produce values between [0,1]. The cost values are sorted according to the optimal measure's magnitudes for visualization purposes. The raw values produced by the approximate measures will always overestimate the cost; normalizing by the maximum cost value simply allows us to view them against the optimal measure on the same scale.

The two plots in the righthand column display the rankings for each approximation plotted against the optimal rankings. The diagonals in these plots denote the optimal performance, where the approximate rankings would be identical to the optimal ones. The R values displayed in the legends refer to the Spearman rank correlation scores for each approximation in that experiment; higher Spearman correlations have points clustered more tightly along this diagonal.

Both approximations compute equivalent costs and rankings for the bijective matching case, as indicated by the plots 104a. This is an expected outcome, since the $L_1$ distance over histograms is directly related to histogram intersection if those histograms have equal masses (see the article by Swain and Ballard entitled "Color Indexing", International Journal of Computer Vision, 7(1):11-32, 1991), as they do for the bijective matching test:

$$I(H(Y), H(Z)) = m - \frac{1}{2} \|H(Y) - H(Z)\|_{L_1},$$

if $$m = |Y| = |Z|.$$

The structure along the diagonal in the top right plot reflects the fact that two types (categories) of point sets were present in the data, causing items of the same category to block together when they are sorted by matching cost. The square-shaped cluster in the upper right portions of the plots show that while the approximate measures do not distinguish between all examples within a category precisely the way the optimal measure does, they do both consider all items within one category to be most distant from an example drawn from the other category. Similarly, there are discontinuities in the left plot of plots 104a due to distance clusters caused by drawing point sets from two distinct category models.

However, for the partial matching case as shown in plots 104b, the $L_1$ approximation fails because it can handle only sets with equal cardinalities and requires all points to match to something. In contrast, the pyramid match can also approximate the partial matching for the unequal cardinality case: its matchings continue to follow the optimal matching's trend since it does not penalize outliers, as evidenced by the clustered points along the diagonal in the bottom right ranking quality plot. We have performed this same experiment using data generated from a uniform random point model, and the outcome was similar.

Discriminative Classification Using Sets of Local Features

We will now discuss object recognition experiments using SVMs and provide baseline comparisons to other methods. We use the SVM implementation provided by Chang and Lin in the publication "LIBSVM: a library for SVMs", 2001 and train one-versus-all classifiers in order to perform multi-class classification.

Local affine- or scale-invariant feature descriptors extracted from a sparse set of interest points in an image have been shown to be an effective, compact representation. This is a good context in which to test our kernel function, since such local features have no inherent ordering, and it is expected that the number of features will vary across examples. In the following, we experiment with two publicly available databases and demonstrate that our method achieves comparable object recognition performance at a significantly lower computational cost than other state-of-the-art approaches. All pyramid match run-times reported below include the time needed to compute both the pyramids and the weighted intersections.

A performance evaluation as taught by the article by Eichhorn and Chapelle entitled "Object Categorization with SVM: Kernels for Local Features", Technical Report, MPI for Biological Cybernetics, 2004 and incorporated herein by reference compares various methods in the context of an object categorization task using images from the publicly available ETH-80 database. The experiment uses eight object classes, with 10 unique objects and five widely separated views of each, for a total of 400 images as shown in FIG. 4. FIG. 4 shows example images 104 from an ETH-80 objects database. Five images from each of the eight object classes (apple, cow, dog, pear, car, cup, horse, and tomato) are shown here. A Harris detector is used to find interest points in each image, and various local descriptors (SIFT features, JET, patches) are used to compose the feature sets. A one-versus-all SVM classifier is trained for each kernel type, and performance is measured via cross-validation, where all five views of an object are held out at once. Since no instances of a test object are ever present in the training set, this is a categorization task (as opposed to recognition of the same object).

The experiments show the polynomial-time methods as discussed by Wallraven et al. in the article entitled "Recognition with Local Features: the Kernel Recipe", Proceedings IEEE International Conference on Computer Vision, Nice, France, October 2003 and Kondor and Jebara in an article entitled "A Kernel Between Sets of Vectors", Proceedings of the International Conference on Machine Learning, Washington D.C., August 2003 performing best, with a classification rate of 74% using on average 40 SIFT features per image. Using 120 interest points, the Bhattacharyya kernel as discussed in the above mentioned article by Kondor and Jebara achieves 85% accuracy. However, the study also concluded that the cubic complexity of the method of Kondor and Jebara made it impractical to use the desired number of features.

We evaluated our method on this same subset of the ETH-80 database under the same conditions provided in the article by Eichhorn and Chapelle mentioned above, and it achieved a recognition rate of 83% using PCA-SIFT features as described by Ke and Sukthankar in the article "PCA-SIFT: A More Distinctive Representation for Local Image Descriptors", Proceedings of the IEEE conference on computer Vision and Pattern Recognition, Washington D.C., June 2004, from all Harris-detected interest points (averages 153 points per image) and T=8. Restricting ourselves to an average of 40 interest points yields a recognition rate of 73%. Thus our method performs comparably to the others at their best for this data set, but is much more efficient than those tested above, requiring time only linear in the number of features.

Figure 5:
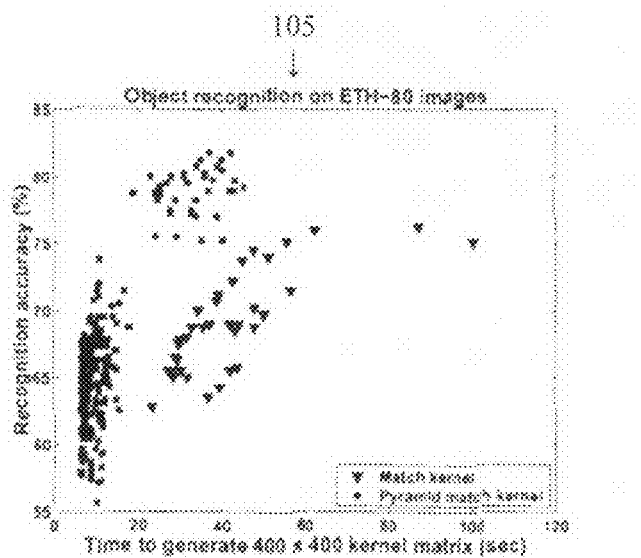
FIG. 5 is a plot showing a comparison of object recognition matching techniques.

In fact, the ability of a kernel to handle large numbers of features can be critical to its success. An interest operator may be tuned to select only the most salient features, but in our experiments we found that the various approaches' recognition rates always benefited from having larger numbers of features per image with which to judge similarity. FIG. 5 depicts a graph 105 showing the run-time versus recognition accuracy of our method as compared to the "match kernel" of the Wallraven et al. method, which has $O(dm^2)$ complexity. Each point in FIG. 5 represents one experiment; the saliency threshold of the Harris interest operator was adjusted to generate varying numbers of features, thus trading off accuracy versus run-time. Computing a kernel matrix for the same data is significantly faster with the pyramid match kernel, and for similar run-times our method produces much better recognition results. FIG. 5 shows, allowing the same run-time, the pyramid match kernel (with T=1) produces better recognition rates than an approach that computes pairwise distances between features in order to match them.

Figure 6:
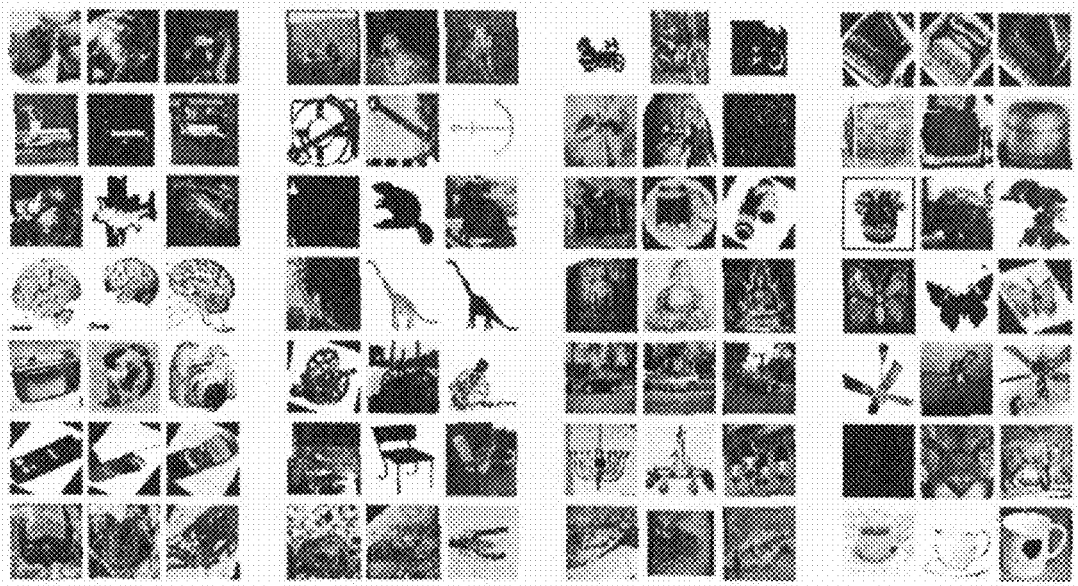
FIG. 6. shows example images where three images are shown for each of 28 objects.

We also tested our method with a challenging database of 101 objects recently developed at CalTech. This database was obtained using Google Image Search, and the images contain significant clutter, occlusions, and intra-class appearance variation. FIG. 6 shows example images 106 from the CalTech 101 Objects database. Three images are shown for each of 28 of the 101 categories. We used the pyramid match kernel with a one-versus-all SVM classifier on the latest version of the database (which does not contain duplicated images). We used the SIFT detector as described by Lowe in the article entitled "Distinctive Image Features from Scale-Invariant Keypoints" as published in International Journal of Computer Vision, 60(2):91-110, January 2004 and 10-dimensional PCA-SIFT descriptors to form the input feature sets, which ranged in size from 14 to 4,118 features, with an average of 454 features per image. We set T=2. We trained our algorithm with 30 unsegmented images per object class; all detected interest point features were included in the input sets. This is an advantage of our approach, since it seeks the best correspondence with some subset of the images' features. It handles unsegmented, cluttered data well.

Eight runs using randomly selected training sets yielded a recognition rate of 43% on the remainder of the database examples. Note that chance performance would be 1%. For this data, performing a single image matching with our method (computing four pyramids and two kernel values) on average required only 0.05 seconds.

Figure 7:
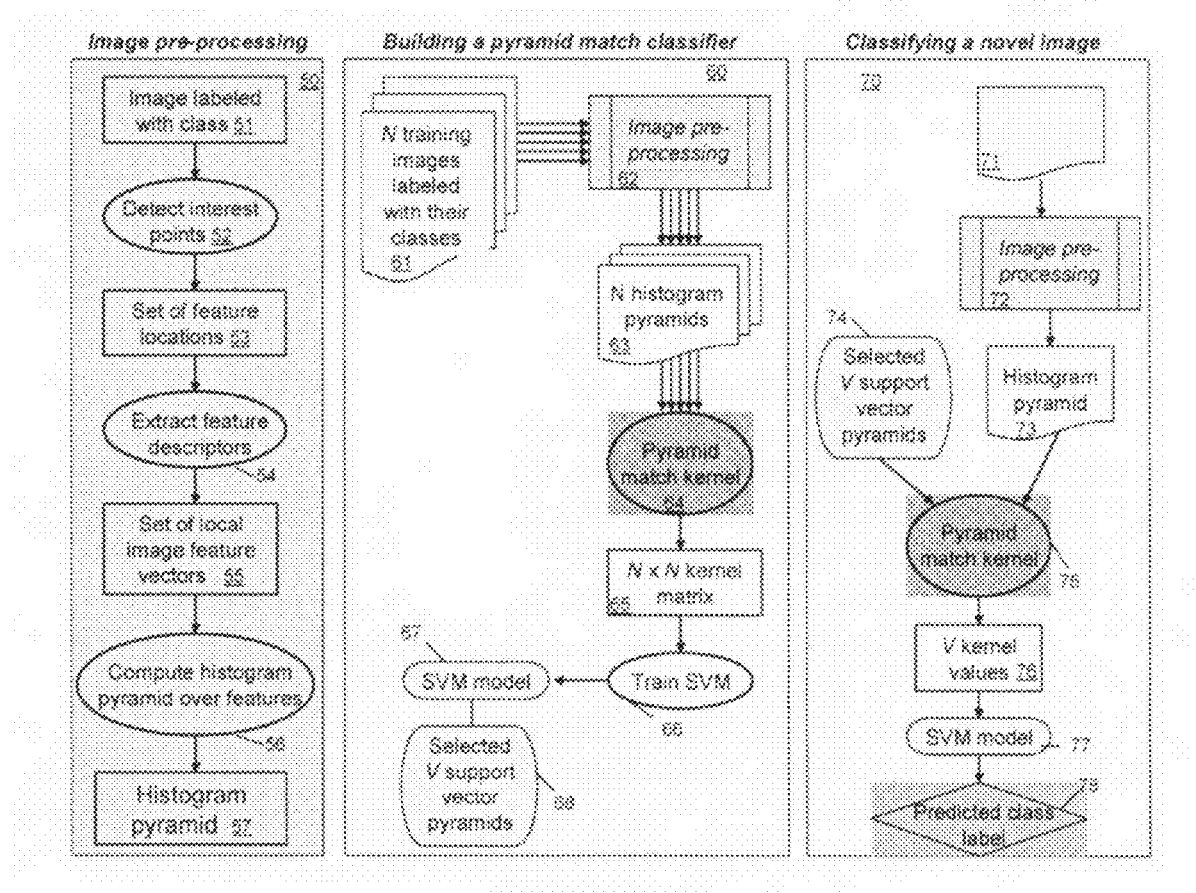
FIG. 7. is a flow chart showing the process steps to implement the invention.

Referring now to FIG. 7, a flow diagram 40 to implement the technique described above using digital signal processor techniques is shown. First, during an image pre-processing process 50, an image is labeled with a class as shown in the first step 51, followed by a detect interest points step 52 to detect points of interest. In the next step 53, a set of feature locations are created followed by the step 54 of extracting feature descriptors. In the next step 55, a set of local image feature vectors are identified, followed by the step 56 of computing a histogram pyramid over the features resulting in a histogram pyramid in step 57.

In a building a pyramid match classifier process 60, a plurality of N training images labeled with their classes are provided in step 61 and are processed in a image pre-processing step 62 to provided a plurality of N histogram pyramids in step 63. The latter are processed through a pyramid match kernel in step 64 to provide a N×N kernel matrix in step 65 which is used to train a support vector machine (SVM) in step 66 to provide a support vector machine model in step 67. The latter is used to provide in step 68 selected V support vector pyramids.

In a classifying a novel image process 70, a novel test image is provided in step 71 to the image pre-processing process in step 72 resulting in a histogram pyramid in step 73. The latter and the selected V support vector pyramids provided in step 74 are processed in step 75 in the pyramid match kernel resulting in V kernel values being provided in step 76. The V kernel values are provided to the SVM model in step 77 which provides a predicted class label for the image in step 78.

Learning a Function over Sets of Features

Having described various aspects of the invention, in the following experiments we demonstrate the pyramid match applied to two regression problems: time of publication inference from a collection of research papers, and articulated pose estimation from monocular silhouettes. We again use the SVR implementation of Chang and Lin. In these experiments we use an $\epsilon$-insensitive loss function in order to obtain solutions that are defined in terms of a small subset of the training examples, and which provide good generalization ability. For all experiments, the SVR parameters C and $\epsilon$ were chosen using cross-validation.

Estimating a Document's Time of Publication

We have applied our method to learn a function that maps a bag of local latent semantic features extracted from a research paper (written in a specific field) to estimate of the paper's year of publication. The bag-of-words model is a widely used representation in which each document is represented by a vector giving the frequencies of words that occur in it, and it has been used in kernel methods as described by Shawe-Taylor and Cristianini in "Kernel Methods for Pattern Analysis", Cambridge University Press, 2004. The well-known limitation of such a model, however, is that it encodes nothing about the semantic relationships between words. Each word is treated as an isolated entity, ignoring the fact that distinct words may share degrees of semantic equivalency (e.g., synonyms), or may have different connotations in different contexts (e.g., homonymy). Researchers have therefore adopted latent semantic indexing (LSI) as described by Deerwester et al. in "Indexing by Latent Semantic Analysis", Journal of the American Society for Information Science, 41(6):391-407, 1990 to instill semantic cues into the basic bag-of-words representation. LSI projects data onto a subspace determined using singular value decomposition (SVD) to represent document-term frequency vectors in a lower-dimensional space where semantic relations are better preserved. Generally the subspace for LSI is learned from document vectors that give the frequency of occurrence for each given word (see the article by Cristianini et al. entitled "Latent Semantic Kernels", Journal of Intelligent Information Systems, 18(2/3):127-152, 2002), which means each document is mapped to a point in a "semantic space" where documents with correlated word frequencies are related.

However, requiring a document to map to a single point in this space assumes that inputs have no clutter (e.g., extra words caused from OCR errors, or text inserted from a webpage ad), and that each document can be represented as a linear combination of the document-level concepts recovered by LSI. Instead, we propose treating documents as bags of word meanings by learning the subspace for LSI from term vectors, which record the frequency with which a word occurs in each given document. Each document is then a bag of local semantic features, and two documents are compared with the partial matching implied by the pyramid match kernel, i.e., in terms of how well (some subset) of the LSI term-space projections can be put into correspondence. Note that standard kernels (e.g., linear, RBF, polynomial) cannot be used with the bag of word meanings representation, since each word is represented by a real-valued vector. Additionally, our method makes it possible to learn a latent semantic space from narrower contexts than entire documents (e.g., paragraphs or sentences) and then represent documents by their component features in this space. We have experimented with a database containing 13 volumes of Neural Information Processing Systems (NIPS) proceedings—a total of 1,740 documents, available online. For each paper, we extracted the text from the abstract up to, but not including, the references section. While authors' names and bibliography information would likely be good indicators of publication time, they were excluded from the bags of features because we want our method to learn a function indicting topic trends over time, as opposed to a look-up table of dates and names. We applied standard steps to pre-process the text data. Suffixes were removed from words using the Porter stemmer (as described by Porter in "An algorithm for Suffix Stripping", Program, 14(3):130-137, 1980), and the WordNet set of stop-list words were removed. Finally, co-occurrence matrices were weighted using term frequency-inverse document frequency (tf-idf) to normalize for text lengths and distill the most informative words.

Figure 8:
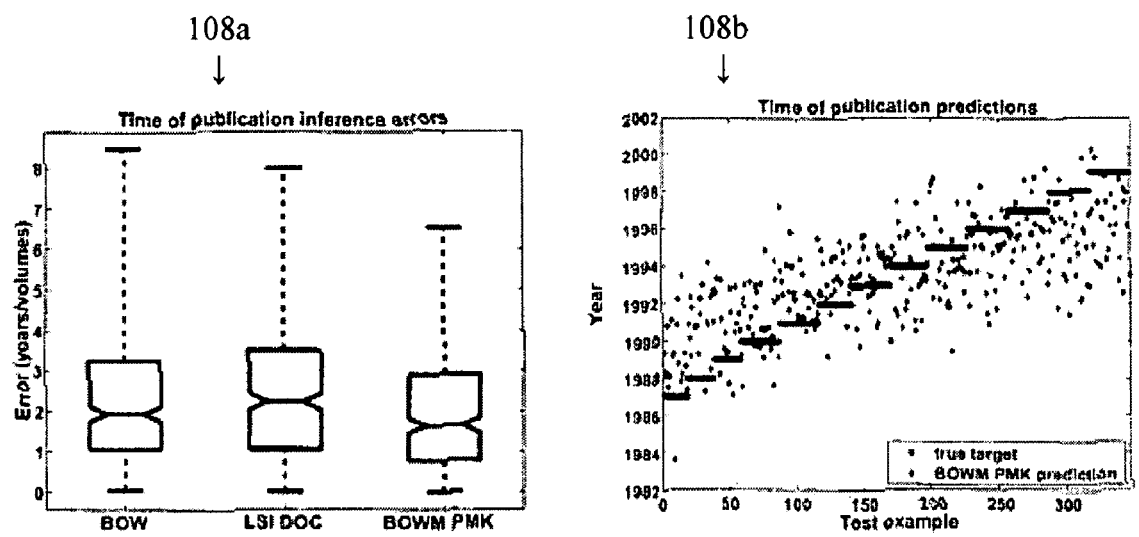
FIG. 8 shows graphs inferring the time of publication for papers from 13 volumes of NIPS proceedings.

FIG. 8 shows results for regressing directly on the year of publication for a NIPS paper using the classic bag-of-words approach (BOW), a standard approach applying LSI at the document level (LSI DOC) (as described by Cristianini et al. as mentioned above), and our method with bags of word meanings (BOWM PMK). All methods were trained with the same randomly selected subset of the data (1393 examples) and tested with the remaining 347 examples. Our approach with bags of word meanings performs the best, with a median error of 1.6 years. The pyramid match kernel values took on average 0.002 seconds to compute. Using a paired difference T-test with $\alpha=0.01$, we found the difference in performance between our approach and the two existing methods to be statistically significant. FIG. 8 shows graphs inferring the time of publication for papers from 13 volumes of NIPS proceedings. Box-plots 108a compare errors produced by three methods with a support vector regressor: bag-of-words (BOW) and latent semantic document-vectors (LSI DOC) with linear kernels, and "bag of word meanings" with the pyramid match kernel of the present invention (BOWM PMK). Lines in center of boxes denote median value, top and bottom of boxes denote upper and lower quartile values, dashed lines show the extent of the rest of the errors. The plot 108b on the right shows the true targets and corresponding predictions made by the pyramid match method (BOWM PMK).

Inferring 3-D Pose from Shape Features

In this set of experiments, we use regression with the pyramid match kernel to directly learn the mapping between monocular silhouette images of humans and the corresponding articulated 3-D body pose. Many vision researchers have addressed the difficult problem of articulated pose estimation. Recent approaches have attempted to directly learn the relationship between images and 3-D pose. See for example, the article by Agarwal and Triggs entitled "3D Human Pose from Silhouettes by Relevance Vector Regression", Proceedings of the IEEE Conference on Computer Vision and Pattern Recognition, June 2004; the article by Shakhnarovich et al. entitled "Fast Pose Estimation with Parameter-Sensitive Hashing", Proceedings IEEE International Conference on Computer Vision, Nice France, October 2003; and the article by Grauman et al entitled "Inferring 3D Structure with a Statistical Image-Based Shape Model", Proceedings IEEE International Conference on Computer Vision, Nice France, October 2003. Like these techniques, we learn a function that maps observable image features to 3-D poses.

However, whereas ordered, fixed-length feature sets are required by Grauman et al. and Shakhnarovich et al. mentioned above (i.e., points are extracted in sequence around the contour, or features are taken from fixed image windows), our new method accepts unordered features and inputs that may vary in size. This is a critical difference: images will naturally have varying numbers of features (due to occlusions, clutter, translations, shape deformations, viewpoint changes, etc.), and a robust global ordering among features within a single view may not be possible in the presence of viewpoint and pose variations. In the pose estimation method as described by Agarwal and Triggs in the article entitled "3D Human Pose from Silhouettes by Relevance Vector Regression", Proceedings of the IEEE Conference on Computer Vision and Pattern Recognition, June 2004, local features are mapped to pre-established prototypes, and every image is represented by a frequency vector counting the number of times each prototype occurred. A relevance vector machine is then trained using these vectors with a Gaussian kernel. While this approach allows unordered features, it can be sensitive to clutter, as we will describe below.

Figure 9:
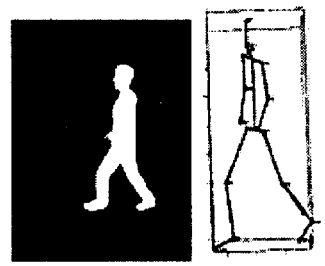
FIG. 9 is an example generated with graphics software composed of a silhouette and its corresponding 3-D pose, as represented by the 3-D positions of 15 joint positions.

As a training set, we used 3,040 images of realistic synthetic images of pedestrians generated using the graphics package POSER. Each image was rendered from a humanoid model with randomly adjusted anatomical shape parameters walking in a randomly selected direction. For each image, both the silhouette and the 3-D locations of 15 landmarks on the model's skeleton corresponding to selected anatomical joints were recorded as shown in FIG. 9. Regressors are trained with silhouette inputs and produce 3-D joint position outputs. Once regressors have been trained with the synthetic data, we can use them to perform regression with either additional synthetic examples (for which we have ground truth poses), or with real image data (for which we can only evaluate predicted poses qualitatively). As shown in FIG. 9, a training example generated with graphics software is composed of a silhouette and its corresponding 3-D pose, as represented by the 3-D positions of 15 joint positions.

We represent each silhouette with a set of local contour descriptors. At each contour point, we extract a shape context histogram (as described in the article by Belongie et al. entitled "Shape matching and Object Recognition Using Shape Contexts", IEEE Transactions on Pattern Analysis and Machine Intelligence, 24(24):509-522, April 2002, which bins nearby edge pixels into a log-polar histogram, thereby encoding local shape. For each shape context histogram, we used 12 angular and five radial bins with a fixed scale to capture only local points relative to each edge point. To form a more compact descriptor, we used 5-D PCA projections of the initial 60-D shape context histogram features. Thus each silhouette shape is represented by an unordered set of shape context subspace features, and each set varies in size due to the varying number of contour points per image. Note that although this representation does not contain explicit spatial constraints, the overlap between neighboring shape context histograms provides an implicit encoding of how features should be related spatially.

The number of contour points (and thus features) per image varied from 405 to 878. The multi-resolution histograms used by the pyramid match contained ten resolution levels, as determined by the diameter of the features in the training examples, and each contained on average 2644 non-empty bins. Computing a pyramid match kernel value required about 0.002 seconds. For each dimension of pose targets, we trained an $\epsilon$-intensive SVR using the pyramid match kernel matrix between the training examples. Each SVR had on average 308 support vectors.

As a baseline, we also implemented a method that uses frequency vectors over feature prototypes to represent each image (using the technique described by Agarwal and Triggs mentioned above as a guideline). Vector quantization (VQ) is performed on the shape context subspace features found in the training set to establish a set of 100 prototype features. Then all of the features detected in a new image are mapped to a 1-D frequency histogram over these prototypes using soft voting with Gaussian weights. A Gaussian RBF kernel is then applied, with $\gamma$ chosen based on the maximum inter-feature distance. In the following we will refer to this baseline as VQ-RBF.

Figure 10:
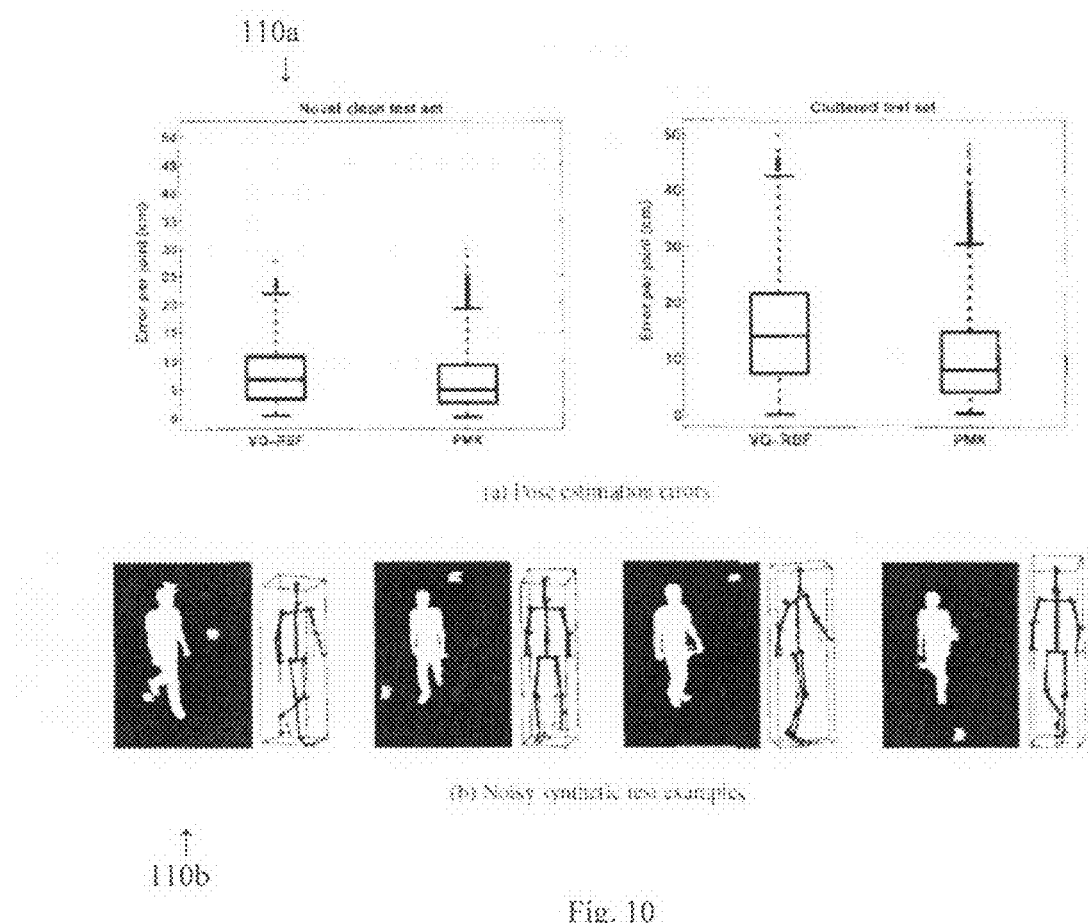
FIG. 10 are diagrams of various Pose inference results.

For a novel test set of 300 POSER-generated silhouettes, the pose inferred by our method had a median error of 4.9 cm per joint position. For the same test set, VQ-RBF obtained a slightly worse median error of 6.8 cm (see FIG. 10). Using a paired difference T-test with $\alpha$=0.001, we found the difference in performance between the two methods to be statistically significant. FIG. 10 shows various Pose inference results. The top row 110a gives a quantitative evaluation of performance on synthetic data with ground truth. The boxplots compare the error distributions for the pyramid match kernel (PMK) and a RBF kernel over prototype frequency vectors (VQ-RBF). Errors are measured by the distance between the 15 true and inferred joint positions. Results for two test sets are shown: a set of novel, clean silhouettes (left plot), and a set with randomly generated clutter or extra foreground blobs (right plot). The bottom row 1110b shows examples poses inferred by our method from synthetic cluttered silhouettes. In each, the true pose (solid) is overlayed with the estimate (dotted). These examples contain average case errors.

The silhouette contours produced with POSER are of course very "clean", that is, the shapes are perfectly segmented since they were formed by directly projecting the CG body. While it is reasonable to train a model with this well-segmented data, we can expect real-world examples to exhibit poorer foreground-background segmentation due to occlusions, clutter, shadows, or backgrounds that look similar to the foreground object. Therefore, we altered the silhouettes for a separate test set of 300 examples to introduce clutter and occlusions; starting with a POSER silhouette, we generated one to eight random blob regions in the image for which the foreground/background labels were swapped. The blobs' position, sizes, and shapes were generated randomly. The result is a test set that attempts to mimic real-world occlusions and clutter, yielding imperfect contours for which estimating pose is more challenging.

On the cluttered test set, our method inferred poses with a median error of 8.0 per joint, while VQ-RBF had a median error of 14.1 cm as shown in FIG. 10. Again, using a paired difference T-test, we found the difference in performance to be statistically significant: with 99.99% confidence, the pyramid match yields average errors that are smaller than those of VQ-RBF by amounts between 4.5 and 5.2 cm per joint.

This experiment demonstrates the pyramid match kernel's robustness to superfluous features in an input. The blobs added to the cluttered test set introduced extra contour features to the silhouettes, and they altered parts of the true contour in cases where they overlapped with the real silhouette. The VQ-RBF distance over prototype frequency vectors essentially penalizes any features that have no "match" in a support vector training example's set of features. In contrast, the pyramid match's partial matching rewards similarity only for the features placed into correspondence, and ignores extraneous clutter features. This is an important advantage for many vision applications, where segmentation errors, viewpoint changes, or image noise will often effect which features (and how many) are detected.

Figure 11:
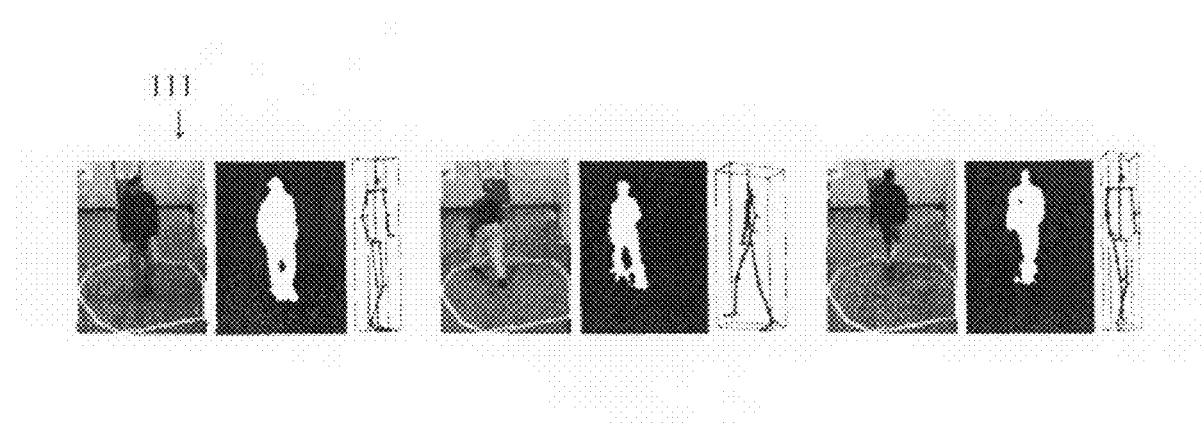
FIG. 11 are examples of Pose inference on real images.

Finally, we applied our method to a test set of real images or various subjects, walking through a scene. A basic background subtraction method was used, which resulted in rough segmentations; body parts are frequently truncated in the silhouettes where the background is not highly textured, or else parts are inaccurately distended due to common segmentation problems from shadows. Ground truth poses are not available for this test set, but FIG. 11 shows some example output poses 111 inferred by our method.

It should be appreciated that current approaches to object and scene recognition typically require some amount of supervision, whether it is in the form of class labels for training examples, foreground-background segmentations, or even a detailed labeling of objects' component parts. In part due to the significant expense of providing these manual annotations, such approaches are in practice restricted to relatively small numbers of classes and/or few training examples per class. Additionally, human supervision may result in unintentional biases that can be detrimental to generalization performance. An unsupervised (or semi-supervised) technique able to recover salient categories directly from images would relieve these burdens and possibly offer new insights into image representation choices. In this invention, we offer an efficient method to automatically learn groupings over sets of unordered local features by embedding the sets into a space where they cluster according to their partial-match correspondences. Each image two nodes (sets) is weighted according to how well some subset of the two sets' features may be put into correspondence, with correspondence quality determined by descriptor similarity. A spectral clustering algorithm using the normalized cuts criterion of Shi and Malik (see article entitled "Normalized Cuts and Image Segmentation" IEEE Transactions of Pattern Analysis and Machine Intelligence, 22(8):888-905, August 2000) is then applied to the graph's affinity matrix to produce an initial set of image groupings. In an (optional) semi-supervised paradigm, we allow the user to select pairwise constraints between some number of input images, where constraints are in the form of "must-group" or "cannot-group" specifications. The affinity matrix is then modified to incorporate the user-supplied groupings prior to the spectral clustering step. Spectral clustering on approximate partial match similarity scores is efficient and produces clusters that coarsely group distinct object classes. To improve specificity, and to develop a predictive classifier that can label unseen images, we develop a method to find prototypical examples in each cluster that are more likely to be class inliers, and then use these prototypes to train a predictive model. We detect prototype examples by examining the pattern of partial match correspondences within a cluster. Outlier cluster members are identified as those images which cause most images within the cluster to contribute an inconsistent subset of features in a partial match. With the assumption that outlier images will be less likely to match the same features as the majority of inlier images, we re-weight intracluster matching scores under a per-image mask representing the image elements which were most likely to be in correspondence when matched to other examples in the cluster. Implied in the motivation for unsupervised learning of categories is that whereas labeled data is expensive and must be used frugally, unlabeled data is generally inexpensive to obtain in large quantities. Thus a critical criterion for a method intended to learn from large amounts of unlabeled data is computational efficiency; with this important consideration, we have designed a method that will scale well with both the size of the input data set as well as the size of the inputs themselves.

Possible applications of the described method include learning object class models from unlabeled data, shot matching or scene grouping from video sequences, and in this description we demonstrate the applicability to learning object categories to allow unsupervised training of discriminative classifiers.

Much recent work has shown that sets of local image features are a powerful representation for recognition and retrieval. Whereas global vector-based representations are known to be sensitive to real-world image variations, local features are often more reliably detected and matched across different examples of an object or scene under varying viewpoints, poses, or lighting conditions. It is unclear, however, how to appropriately apply conventional unsupervised learning techniques in this domain, where every example is a set of unordered feature vectors, and each set may vary in size. Existing approaches to this problem use vector quantization to build a codebook of feature descriptors, and then transform each set input to a single vector counting the number of occurrences of each prototype feature. Conventional clustering methods or latent semantic analysis (LSA) may then be directly applied, and have been shown to yield promising results when learning object categories or filtering keyword-based image retrieval outputs.

However, such an approach does not explicitly allow for "clutter" features caused by image backgrounds or occlusions, and the need to pre-compute a codebook raises computational complexity and data availability issues. In addition, it is not clear how existing techniques could accommodate the addition of small amounts of labeled data or a priori knowledge about pairwise constraints between particular unlabeled examples. In general methods to solve for explicit correspondence are computationally expensive, and can in the worst case require cubic time to form optimal assignments, and exponential time for assignments including higher order constraints between features. A number of approximate methods have been defined, which offer improved performance under certain restrictions.

The article "Shape matching and Object Recognition using Low Distortion Correspondences" by A. Berg, T. Berg and J. Malik, Proceedings of the IEEE Conference on Computer Vision Pattern Recognition, San Diego Calif., June 2005, described a powerful recognition algorithm that uses linear programming to solve for approximate correspondences, and they showed how to use the correspondence-based metric to find regions of common spatial support for objects in labeled training examples, thus avoiding the need for manually segmented images. A kernel providing an efficient approximation of the optimal partial matching between two sets was recently developed for discriminative classification. Sets of local image descriptors are compared in terms of how well some subset of their features may be put into correspondence. However, in the recognition framework, it is assumed that class labels are provided for all training images.

Given a collection of unlabeled images, our method produces a partition of the data into a set of learned categories, as well as a set of classifiers trained from these ranked partitions which can recognize the categories in novel images. Each image is represented by an unordered set of local features. First, pairwise affinities reflecting partial-match feature correspondences are computed for all input images. A variable amount of supervised labels (pairing constraints) are optionally collected from the user, and the affinity matrix is adjusted accordingly. Spectral clustering with the normalized cuts criterion is then used to recover the initial dominant clusters. Then, this clustering is distilled to sets of prototypical examples from each category by evaluating the typical "feature masks" contributing to each within-cluster partial matching. A thresholded subset of the refined groupings compose the learned categories, which are used to train a set of predictive classifiers for labeling unseen examples.

Grouping Feature Sets with Partial Correspondences

Every input image is decomposed into some number of local appearance features, where each feature is a vector descriptor for the local region or patch. So given an unlabeled data set $U=\{I_1, \ldots, I_N\}$ containing N images, image $I_i$ is represented by a set $X_i=\{f_1, \ldots, f_{m_i}\}$ where $F_j$ is a descriptor vector, and $m_i$ may vary across U depending on the number of features detected in each image. In our implementation we chose to use the SIFT descriptor, but other options are of course possible. The initial image groupings are formed by embedding the feature sets into a space where they cluster according to their partial-match correspondences. We use the pyramid match kernel, which was recently introduced for discriminative classification to efficiently obtain these matchings.

Comparing sets of image descriptors in this way provides an efficient (linear in m) measure of how well the two sets' features may be put into correspondence. The matching is "partial" since a subset of the sets' features may be ignored without any penalty to the matching score. This is desirable when we want to learn from unlabeled images containing multiple classes, varying backgrounds, and occlusions; cases where portions of the feature sets may be considered outliers that should not impact the matching quality.

The pairwise pyramid match affinities over feature sets serve to form an undirected, fully-connected graph over U: nodes are images, and edges are weighted according to partial-match similarity between the images' feature sets. Within this graph, we would like to discover categories from those images with the strongest aggregate feature matchings. We seek the partitioning of the nodes that will preserve strongly connected groups while dividing nodes with minimal joint correspondences.

To this end, we employ spectral clustering and use the normalized cuts criterion as taught by Shi and Malik for image segmentation. The algorithm "cuts" the nodes into disjoint sets by removing connecting edges; the optimal partitioning both minimizes the amount of dissociation between groups and maximizes the association within groups. The normalized cut dissociation measure is essentially designed to remove edges between the least similar nodes without favoring cuts that partition out small numbers of isolated points. In our case, this means enforcing that a few images that happen to have exceptional feature matchings should not be selected as categories when there exist broader range associations between feature sets.

Though minimizing the normalized cut is NP-complete, Shi and Malik (see article entitled "Normalized Cuts and Image Segmentation" IEEE Transactions of Pattern Analysis and Machine Intelligence, 22(8):888-905, August 2000) provide an efficient approximate solution based on solving an eigenvalue problem, $$D^{-\frac{1}{2}}(D-K)D^{-\frac{1}{2}}x = \lambda x,\qquad \text{Eq. 9}$$

where K is an N×N affinity matrix over data nodes $\{X_1, \ldots, X_N\}$, D is a diagonal matrix containing the sums of the rows of K, and x is an indicator vector specifying the bi-partition of the graph. To form multiple partitions, recursive cuts or multiple top eigenvectors are used. Extracting the normalized cuts grouping over the pyramid match affinity matrix for the images in U thus provides our initial set of learned categories.

This framework allows the introduction of weak semisupervision in the form of pairwise constraints between the unlabeled images. Specifically, a user may specify "cannot-group" or "must-group" connections between any number of pairs in the data set. Following the paradigm suggested by S. Kamvar, D. Klien and C. Manning in "Spectral Learning", we modify the graph over U to incorporate this information to assist category learning: entries in the affinity matrix K are set to the maximal (diagonal) value for pairs that ought to be reinforced in the groupings, or set to zero for pairs that ought to be divided.

Computing affinities with the pyramid match requires time only linear in the set size, specifically O(mL) for sets with O(m) features and pyramids with L levels. For data sets with a large number of example sets to be clustered, we can avoid computing all $O(N^2)$ affinities and obtain a more efficient estimate of the pyramid match kernel matrix by employing the Nystrom approximation technique.

Inferring Category Feature Masks

Due to the nature of a partial matching, the clusters produced with normalized cuts risk containing nonhomogenous members. While ignoring superfluous features without penalty to the matching similarity is desirable in the sense that it allows a degree of tolerance to clutter, outlier features, and noise, it also means that sets containing similar backgrounds may be allowed to match just as well as those containing similar objects of interest. Likewise, images containing multiple objects may find strong partial matchings with examples containing single objects from each class, thereby confounding the normalized cuts criterion in some cases.

Figure 12:
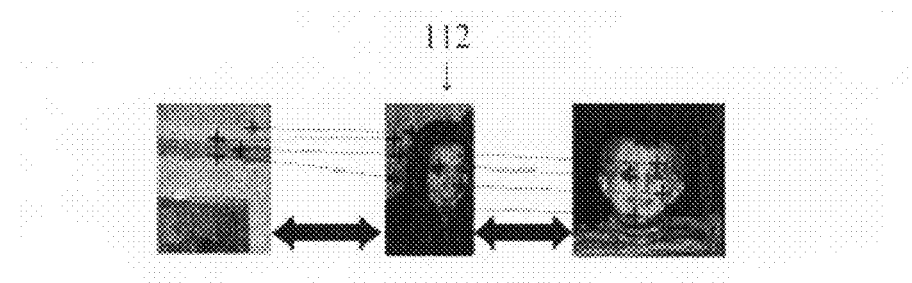
FIG. 12 shows an example where partial matching may be difficult.
Figure 12A:
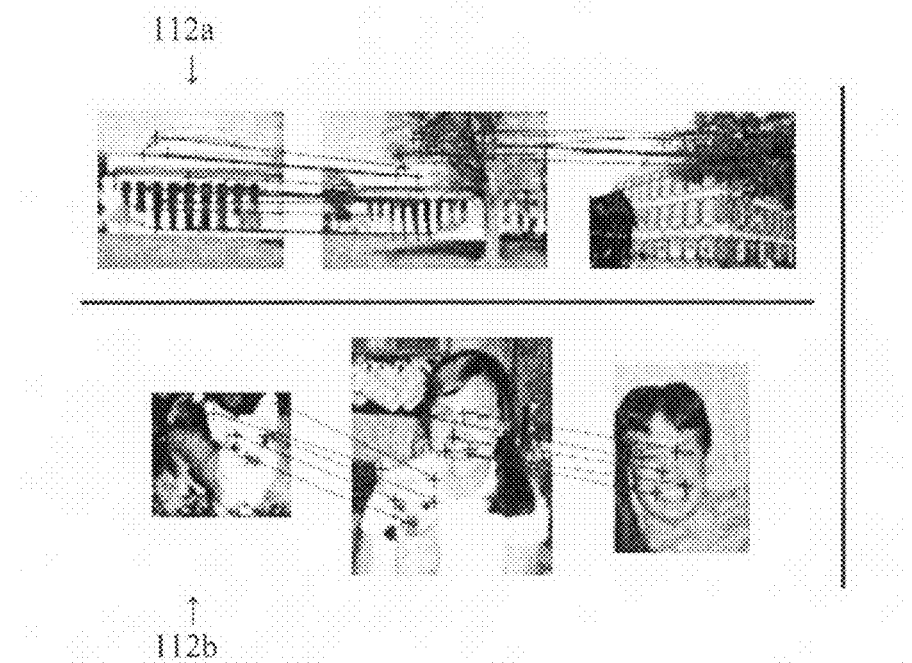
FIG. 12A shows additional examples where partial matching may be difficult.

Graph partitioning according to partial matchings may allow problematic groups, for example when background features and foreground features find good matchings in different categories of images. As shown in FIG. 12, the image-to-image similarity between the left and center images 112 may be indistinguishable from that of the center and right images 112, even though the left image is matching what are background features for the center image category. As a result, a graph clustering algorithm would have difficulty deciding which pair of images to cut, even though to a human observer the right pair is clearly in-class. FIG. 12A also shows graph partitioning according to partial matchings may allow problematic groups, for example when background features and foreground features find good matchings in different categories of images. In the top row of images 112a, the image-to-image similarity between the right and center images may be indistinguishable from that of the center and left images, even though the right image is matching what are background features for the domed building category. In the bottom row of images 112b, the presence of two categories in the center image causes it to match equally well to the images on its left and right, which contain individual instances of those categories. As a result, graph partitioning algorithms may be unable to make appropriate cuts.

To address this, we look to the pattern of correspondences within each cluster, and leverage the information contained in the intra-cluster partial matching statistics to refine the initial grouping. The goal is to identify prototypical cluster members (or, conversely, outlier cluster members) by computing for each example the distribution of its features $\{f_1, \ldots, f_{m_j}\}$ that was used to form matchings with other examples within the cluster. The intuition is that we expect "inlier" images to utilize similar portions of their feature sets to form partial matches with one another, while outlier cluster members will cause most images within the cluster to contribute an inconsistent subset of features relative to its other matchings.

To apply this concept, we require the inter-feature correspondences for the pairwise partial matches within each cluster. While the method previously presented provides an efficient estimate of the overall matching score, it does not offer an explicit correspondence field. Here we derive a method for inducing the approximate correspondences implied by a pyramid match between two images.

The pyramid match considers feature points matched at the finest resolution pyramid level that they fall into the same bin. This means that at any bin where two point sets both contribute points, the points from the set with fewer points in that bin are certainly matched, but only some (unknown) subset of points is matched from the set having more points in that bin. If counts are equal in a given bin, all points falling in that bin from both sets are matched to each other, in some permutation.

When computing the multi-resolution histograms for an input set of descriptors, we attach to each bin count the indices of the features that the bin spans. This allows us to trace feature matchings during the summation over histogram intersections based on which specific points are responsible for causing an intersection at a particular level. For each input $X_i$, a weighted indicator vector $r_i$ of dimension $m_i$ is maintained, i.e., $r_i$ is indexed by the input's feature set. Each indicator is initialized to zero, and then at each level of the pyramid intersections it is updated to reflect the new matches formed.

The partitioning of the feature space provided by the pyramid decomposes the required matching computation into a hierarchy of smaller matchings. Upon encountering a bin with a nonzero intersection value at level k, entries in the indicator vector corresponding to the attached feature indices for set $X_i$ are set to $\frac{1}{2}^k$, the similarity weight associated with level k. We compute the intersections starting at level L, so that finer resolution matches (reflecting more similar pairings) replace coarser resolution matches. When there is ambiguity between two possible match points, we consider them to be equally valid correspondence hypotheses and assign an equal weighting between them.

This process is directly incorporated into the computation of K above. Note that the only complexity added to the original pyramid match is the space requirement for the indicators and the indices attached to nonzero bin entries, and the (still linear) time to mark the indicators when computing intersections.

Figure 13:
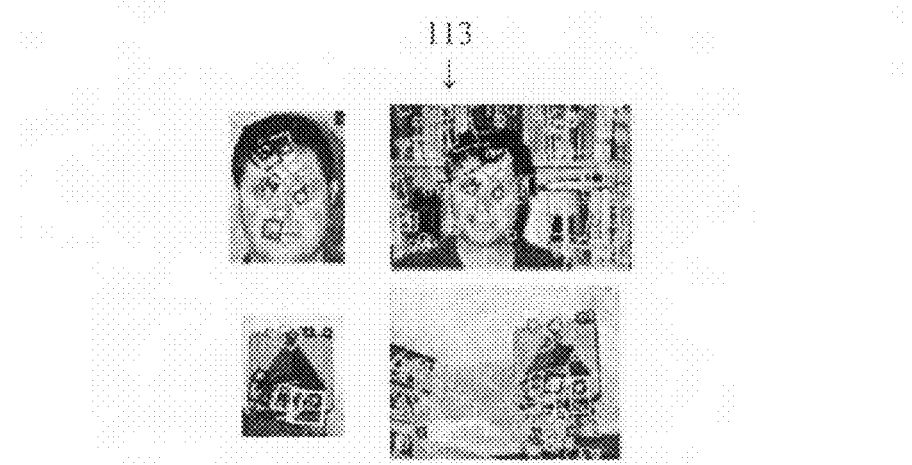
FIG. 13 shows examples of explicit feature correspondences extracted from a pyramid matching.

The result is one weighted indicator vector per image, per matching comparison that reveals both which features were used in each partial match, as well as how strongly those features played a role in the total matching cost. We use these indicator vectors as feature masks designating for a given set which component features it contributed to matchings. For each image in a cluster containing C members, a typical feature mask is computed as the median indicator vector over that image's C−1 within cluster matchings. FIG. 13 shows examples of explicit feature correspondences extracted from a pyramid matching. Displayed are the most confident matches found for two image pairs 1113, as denoted by the feature patches.

Identifying Prototypes

To refine the groupings provided by normalized cuts clustering, the pyramid match affinities are re-computed between cluster members using the median feature masks to weight the input feature sets. That is, rather than unit bin count updates, each feature adds a mass to the bin that is proportional to its weighting in the median feature mask for that example. Essentially this re-weights the individual feature matchings to favor those that are established between features likely to belong to the "inlier" cluster examples, and to downplay those caused by the inconsistent outlier matchings.

Figure 14:
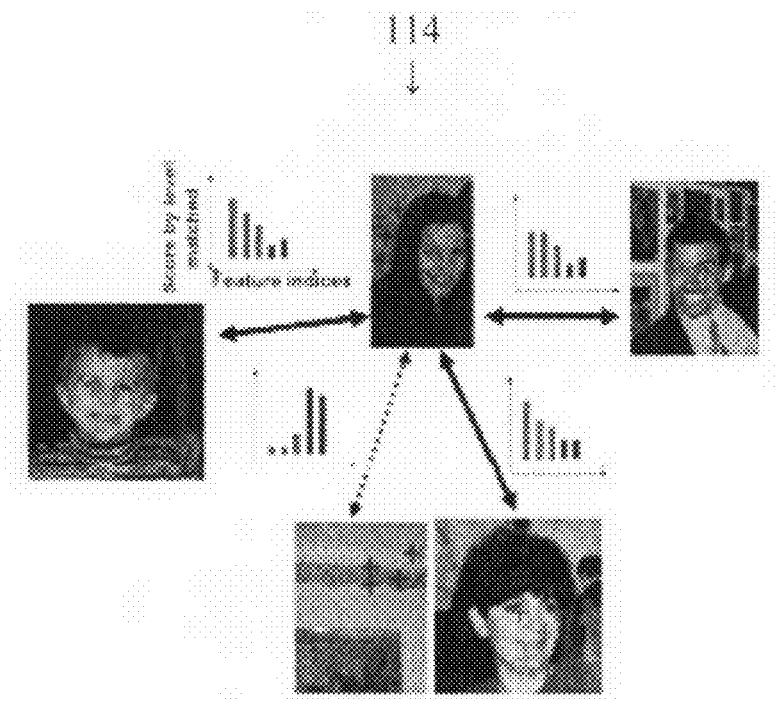
FIG. 14 shows a schematic view of category feature mask inference.

FIG. 14 shows a schematic view of category feature mask inference. Within a single cluster, outlier images are detected by considering the typical per-image feature masks implied by which component features an image contributes to partial matchings with other members of the cluster. In this illustrative example, the similarity between the matched-feature distributions among the faces 114 reveals the outlier non-face image, whose features happen to match the background of the top image. Shown are the four matched feature distributions for the top center image against the rest, with the in-mask features colored green, and non-mask features colored red. Re-weighting the correspondences according to the example's median indicator mask causes the similarity against the outlier image to be downgraded, as indicated by the dashed line. To deduce cluster outliers, feature masks are determined using all pairs in this manner.

This new C×C affinity matrix is left un-normalized, since given the feature masks we no longer wish to treat small correspondence fields as being equally significant to large ones.

We define the flux/flow per example within a cluster to be the sum of its re-weighted pyramid match scores against the rest of the cluster members. Items in the cluster are then ranked according to their flow magnitudes, and examples falling within a specified top percentile of this ranking are identified as candidate prototypes. In our implementation we have evaluated the categories learned with no supervision under various settings of the percentile parameter, but we also envision allowing minimal semi-supervision at this stage, where a user could be presented with a small number of prototypes to label. Should the user disagree with the cluster labels, we could introduce link constraints into the re-weighted cluster affinity matrices here (as well as prior to performing normalized cuts) and iteratively recomputed the prototypes.

The prototypes are then considered the best representatives for the particular learned category, and may be used to build a classifier that can predict categories for novel images. In our implementation we have chosen to use a discriminative kernel-based classifier, the support vector machine, since it can directly use the pyramid match kernel matrix as the normalized cuts computation; however, other alternatives are equally plausible.

Computing affinities with the modified pyramid match requires time only linear in the set size, specifically O(mL) for sets with m features and pyramids with L levels. For data sets with a large number of example sets to be clustered, we can avoid computing all $O(N^2)$ affinities and obtain a more efficient estimate of the pyramid match kernel matrix by employing the Nyström approximation technique.

We have obtained improved results evaluating the inventive method when applied to perform unsupervised or semi-supervised learning of object categories, and we show its ability to automatically train a classifier that can be used to predict the labels of unseen images. We have experimented with a common benchmark data set containing four object classes, the Caltech-4 database, which is comprised of 1155 rear views of cars, 800 images of airplanes, 435 images of frontal faces, and 798 images of motorcycles. Many of the images of the airplanes and motorcycles contain white borders which we removed before any processing was done, so as to avoid inserting features that might provide either misleading or helpful cues to our algorithm. In all of the experiments reported below, we have decomposed images into sets of SIFT features scale-invariant descriptors based on histograms of oriented image gradients.

Figure 15:
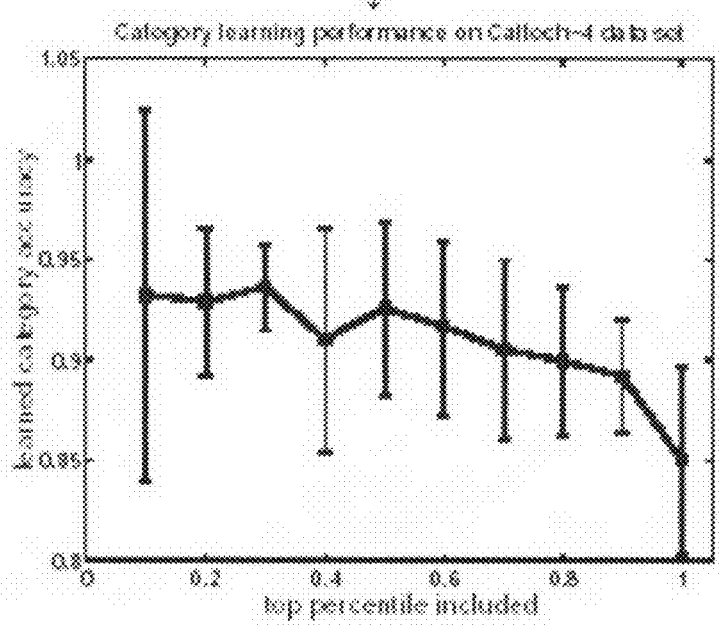
FIG. 15 is a chart showing accuracy of categories learned without supervision, as measured by agreement with ground truth labels.

For the first experiment, we provided our method with a pool of unlabeled images containing examples from each class and requested that it learn four categories. FIG. 15 is a chart 115 showing accuracy of categories learned without supervision, as measured by agreement with ground truth labels. The percentiles determine the amount of prototype candidates to keep per learned class, and results shown here are averaged over 40 runs for each. The plotted points denote the mean performance for those runs and error bars denote the standard deviation. FIG. 15 summarizes the accuracy of the groupings produced as a function of the percentage of prototypes extracted from each initial normalized cuts grouping as discussed above. Accuracy is measured as the mean diagonal of a confusion matrix computed for the learned categories against the ground truth labels. For each percentile level tested, we ran the method 40 times, each time with a different random subset of 400 images from the 3188 total images, with 100 images per class. This result demonstrates the impact of the refinement mechanism to detect prototypical cluster examples based on the inferred feature masks. The number of groupings formed by normalized cuts was specified as the number of classes expected in the data set, however automated model selection techniques could certainly be applied and will be an interesting consideration for future implementations.

In another experiment, we evaluated how the categories learned with our method will generalize to predict labels for novel images. We trained support vector machines with the pyramid match kernel using the labels produced with varying amounts of semi-supervision. Recognition performance is measured as the mean diagonal of a confusion matrix computed for a total of 2788 novel test images of the four classes (ranging from about 300 to 1000 test images per class), and results are averaged over 40 runs with different randomly selected pools of 400 unlabeled "training" images. Semi-supervised constraints are of the "must-group" form between pairs of unlabeled examples, and an equal number of such constraints was randomly selected for each class from among the training pool. The results suggest that the category learning stands to gain from even rather small amounts of weak supervision.

FIG. 16 shows a chart 116 that shows recognition performance on unseen images using categories learned with varying amounts of weak semi-supervision. The horizontal axis denotes the number of (randomly chosen) "must-group" pairings provided, and the vertical axis denotes the recognition performance averaged over four classes. The plotted points are mean values and error bars are the standard deviations over 40 runs with randomly selected training/testing pools.

We have proposed a novel approach to unsupervised and semi-supervised learning of categories from inputs that are variable-sized sets of unordered features. Sets of local image features are efficiently compared in terms of partial match correspondences between component features, forming a graph between the examples that is partitioned via spectral clustering. We have also presented modifications to an existing implicit matching kernel that allow explicit correspondence fields to be efficiently extracted, and have designed a method for inferring the typical feature mask within a learned category using these correspondences. The results indicate that reasonably accurate unsupervised recognition performance is obtainable using a very efficient method.

We have conceived of extensions to our method for unsupervised clustering of visual concepts and the application of the method to the problem of personal media organization. A fundamental problem for current consumer electronic devices is how to organize and retrieve media such as photos and videos from camcorders, cameras, and phones. Current camera phones are often "write-only memory" devices; people take pictures but rarely access them due to the inconvenience of accessing the media files and the difficulty of finding a particular file of interest at a later date.

We propose the use of our semi-supervised clustering methods to help a user organize his or her media files. Using semi-supervised visual clustering, visually similar concepts are found by the system, and the user can label each category with a text keyword. A user can also refine the concept boundary, by specifying which examples should or should not be clustered together. FIG. 17 depicts this invention. A user takes unstructured videos and movies as shown is step 117a. Clusters are formed automatically using the Pyramid Matching Kernel as shown in step 117b. A few images in each cluster are interactively labeled as shown is step 117c. Metadata labels are extrapolated to the entire collection as shown in step 117d. It should now be appreciated using the techniques described above a user may more easily organize media files.

Figure 18:
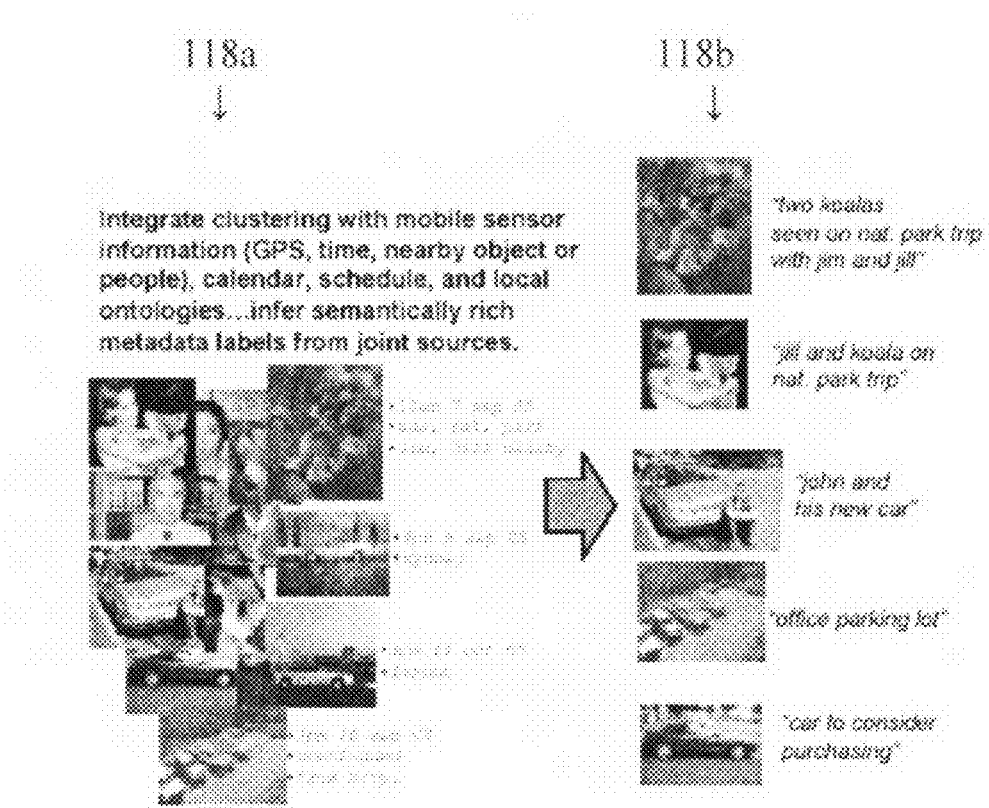
FIG. 18 depicts an embodiment of the invention integrating other information with the organized files.

Additionally, it is beneficial to consider other sources of information that may assist in the process of inferring metadata labels. Information on the device such as the time of day, sensed location from GPS or other network service, calendar or agenda information, and/or information about other devices or users that may be in the local vicinity. For example a series of pictures that were taken in a national park with a particular friend may be grouped together. FIG. 18 depicts this embodiment of the invention. In this embodiment, media files 118a are tagged with additional information such as mobile sensor information (GPS location, time, nearby object or people), calendar information, schedule and local ontologies as well as infer semantically rich metadata labels from joint sources. Clusters are formed from the media files using the Pyramid Matching Kernel. Images 118b in each cluster are interactively labeled and metadata labels are extrapolated to the entire collection. Additional features are integrated into an unsupervised or semi-supervised clustering process using a weighted average of the visual distance and the distance of other features. Alternatively, separate affinity graphs can be defined over the various features and a joint graph clustering optimization function defined.

Data-Dependent Pyramid Structures

Having described the pyramid match kernel, we will now describe an alternative embodiment to include partial matching with pyramid intersection. Pyramid intersection is an efficient method for computing an approximate partial matching between two sets of feature vectors. To be described is a novel pyramid embedding based on a hierarchy of non-uniformly shaped bins that takes advantage of the underlying structure of the feature space and remains accurate even for sets with high-dimensional feature vectors. The matching similarity is computed in linear time and forms a Mercer kernel. The technique provides a new algorithm for computing an approximate partial matching between point sets that can remain accurate even for sets with high-dimensional feature vectors, and benefits from taking advantage of the underlying structure in the feature space. The main idea is to derive a hierarchical, data-dependent decomposition of the feature space that can be used to encode feature sets as multi-resolution histograms with non-uniformly shaped bins. For two such histograms (pyramids), the matching cost is efficiently calculated by counting the number of features that intersect in each bin, and weighting these match counts according to geometric estimates of inter-feature distances. Our method allows for partial matchings, which means that the input sets can have varying numbers of features in them, and outlier features from the larger set can be ignored with no penalty to the matching cost. The matching score is computed in time linear in the number of features per set, and it forms a Mercer kernel suitable for use within existing kernel-based algorithms.

Unlike previous set matching approximations (including the above described pyramid match algorithm, this approach can maintain consistent accuracy as the dimension of the features within the sets increases. We also describe how the data-dependent hierarchical decomposition of the feature space produces more accurate correspondence fields than a previous approximation that uses a uniform decomposition. Finally, using our matching measure as a kernel in a discriminative classifier, we achieve improved object recognition results over a state-of-the-art set kernel on a benchmark data set. Building on the earlier described pyramid match algorithm, a partial matching approximation is provided that also uses histogram intersection to efficiently count matches implicitly formed by the bin structures. Use of data-dependent, non-uniform bins and a more precise weighting scheme results in matchings that are consistently accurate for structured, high-dimensional data.

The feature of this invention is a new very efficient approximate bipartite matching method that measures the correspondence-based similarity between unordered, variable-sized sets of vectors, and can optionally extract an explicit correspondence field. Unlike previous approaches, our method uses the feature distribution to aid the approximation, and it can efficiently produce accurate correspondences even for high-dimensional features. We call this algorithm the vocabulary-guided (VG) pyramid match, since the histogram pyramids are defined by the "vocabulary" or structure of the feature space, and the pyramids are used to count implicit matches. The idea is to first partition the given feature space into a pyramid of non-uniformly shaped regions based on the distribution of a provided corpus of feature vectors. Point sets are then encoded as multi-resolution histograms determined by that pyramid, and an efficient intersection-based computation between any two histogram pyramids yields an approximate matching score for the original sets. The implicit matching version of our method estimates the inter-feature distances based on their respective distances to the bin centers. To produce an explicit correspondence field between the sets, we use the pyramid construct to divide-and-conquer the optimal matching computation. As our experiments will show, the proposed algorithm in practice provides a good approximation to the optimal partial matching, but is orders of magnitude faster to compute.

Let's consider a feature space F of d-dimensional vectors, $F \subset R^d$. The point sets our algorithm matches will come from the input space S, which contains sets of feature vectors drawn from $F:S=\{X|X=\{x_1, \ldots, x_m\}\}$, where each $x_i \in F$, and the value m=|X| may vary across instances of sets in S. Throughout the text we will use the terms feature, vector, and point interchangeably to refer to the elements within a set.

A partial matching between two point sets is an assignment that maps all points in the smaller set to some subset of the points in the larger (or equal-sized) set. Given point sets X and Y, where m=|X|, n=|Y|, and m≦n, a partial matching $M(X, Y, \pi) = \{(x_1, y_{\pi_1}), \ldots, (x_m, y_{\pi_m})\}$ pairs each point in X to some unique point in Y according to the permutation of indices specified by $\pi = [\pi_1, \ldots, \pi_m]$, $1 \leq \pi_i \leq n$, where $\pi_i$ specifies which point $y_{\pi_i}$ is matched to $x_i \in X$, for $1 \leq i \leq m$. The cost of a partial matching is the sum of the distances between matched points:

$$C(M(X, Y, \pi)) = \sum_{x_i \in x} \|x_i - y_{\pi_i}\|_2.$$

The optimal partial matching $M(X, Y, \pi^*)$ uses the assignment $\pi^*$ that minimizes this cost:

$$\pi^* = \frac{\mathrm{argmin}}{\pi} C(M(X, Y; \pi)).$$

It is this matching that we wish to efficiently approximate. Herein below we describe how our algorithm approximates the cost $C(M(X,Y,\pi^*))$, and then we describe how for a small increase in computational cost we can also extract explicit correspondences to approximate $\pi^*$ itself.

Building Vocabulary-Guided Pyramids

The first step is to generate the structure of the vocabulary-guided (VG) pyramid to define the bin placement for the multi-resolution histograms used in the matching. This is a one-time process performed before any matching takes place. We would like the bins in the pyramid to follow the feature distribution and concentrate partitions where the features actually fall. To accomplish this, we perform hierarchical clustering on a sample of representative feature vectors from F.

Figure 19:
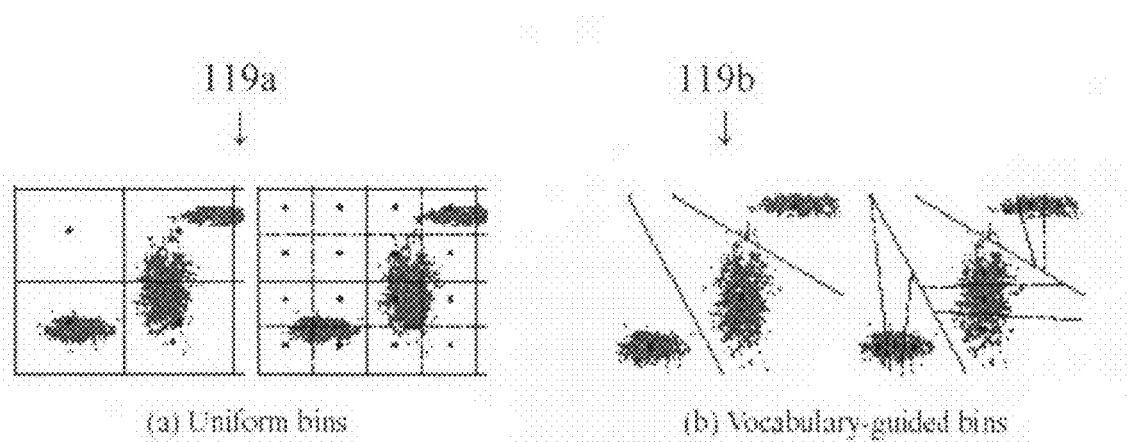
FIG. 19 shows a plot of uniformly-shaped partitions in contrast with a plot where the feature space determines the partition.

We randomly select some example feature vectors from the feature type of interest to form the representative feature corpus, and perform hierarchical k-means clustering with the Euclidean distance to build the pyramid tree. Other hierarchical clustering techniques, such as agglomerative clustering, are also possible and do not change the operation of the method. For this unsupervised clustering process there are two parameters: the number of levels in the tree L, and the branching factor k. The initial corpus of features is clustered into k top-level groups, where group membership is determined by the Voronoi partitioning of the feature corpus according to the k cluster centers. Then the clustering is repeated recursively L−1 times on each of these groups, filling out a tree with L total levels containing $k^i$ bins (nodes) at level i, where levels are counted from the root (i=0) to the leaves (i=L−1). The bins are irregularly shaped and sized, and their boundaries are determined by the Voronoi cells surrounding the cluster centers as shown in FIG. 19. For each bin in the VG pyramid we record its diameter, which we estimate empirically based on the maximal inter-feature distance between any points from the initial feature corpus that were assigned to it.

As shown in FIG. 19, rather than carve the feature space into uniformly-shaped partitions 119a (left), we let the vocabulary (structure) of the feature space determine the partitions 119b (right). As a result, the bins are better concentrated on decomposing the space where features cluster, particularly for high-dimensional feature spaces. These plots depict the grid boundaries for two resolution levels for a 2-D feature space. In both plots 119a and plots 119b, the left plot contains the coarser resolution level, and the right plot contains the finer one. Features are points, bin centers are larger points, and lines denote bin boundaries.

Once we have constructed a VG pyramid, we can embed point sets from S as multi-resolution histograms. A point's placement in the pyramid is determined by comparing it to the appropriate k bin centers at each of the L pyramid levels. The histogram count is incremented for the bin (among the k choices) that the point is nearest to in terms of the same distance function used to cluster the initial corpus. We then push the point down the tree and continue to increment finer level counts only along the branch (bin center) that is chosen at each level. So a point is first assigned to one of the top-level clusters, then it is assigned to one of its children, and so on recursively. This amounts to a total of kL distances that must be computed between a point and the pyramid's bin centers.

Given the bin structure of the VG pyramid, a point set X is mapped to its pyramid $\Psi(X): \Psi(X) = [H_0(X), \ldots, H_{L-1}(X)]$, with $H_i(X) = [<p,n,d>_1, \ldots, <p,n,d>_{k^i}]$, and where $H_i(X)$ is a $k^i$-dimensional histogram associated with level i in the pyramid, $p \in Z^i$ for entries in $H_i(X)$, and $0 \leq i \leq L$. Each entry in this histogram is a triple <p,n,d> giving the bin index, the bin count, and the bin's points' maximal distance to the bin center, respectively.

Storing the VG pyramid itself requires space for $O(k^L)$ d-dimensional feature vectors, i.e., all of the cluster centers. However, each point set's histogram is stored sparsely, meaning only $O(mL)$ nonzero bin counts are maintained to encode the entire pyramid for a set with m features. This is an important point: we do not store $O(k^L)$ counts for every point set; $H_i(X)$ is represented by at most m triples having n>0. We achieve a sparse implementation as follows: each vector in a set is pushed through the tree as described above. At every level i, we record a <p,n,d> triple describing the nonzero entry for the current bin. The vector $p=[p_1, \ldots, p_i]$, $p_j \in [1,k]$ denotes the indices of the clusters traversed from the root so far, $n \in Z^+$ denotes the count for the bin (initially 1), and $d \in R$ denotes the distance computed between the inserted point and the current bin's center. Upon reaching the leaf level, p is an L-dimensional path-vector indicating which of the k bins were chosen at each level, and every path-vector uniquely identifies some bin on the pyramid.

Initially, an input set with m features yields a total of mL such triples. There is one nonzero entry per level per point, and each has n=1. Then each of the L lists of entries is sorted by the index vectors (p in the triple), and they are collapsed to a list of sorted nonzero entries with unique indices: when two or more entries with the same index are found, they are replaced with a single entry with the same index for p, the summed counts for n, and the maximum distance for d. The sorting is done in linear time using integer sorting algorithms. Maintaining the maximum distance of any point in a bin to the bin center will allow us to efficiently estimate inter-point distances at the time of matching, as to be described below.

Vocabulary-Guided Pyramid Match

Given two point sets' pyramid encodings, we efficiently compute the approximate matching score using a simple weighted intersection measure. The VG pyramid provides a partitioning of the feature space at multiple resolutions that is used to direct the matching. The basic intuition is to start collecting groups of matched points from the bottom of the pyramid up, i.e., from within increasingly larger partitions. In this way, we will first consider matching the closest points (at the leaves), and as we climb to the higher-level clusters in the pyramid we will allow increasingly further points to be matched. We define the number of new matches within a bin to be a count of the minimum number of points either of the two input sets contributes to that bin, minus the number of matches already counted by any of its child bins. A weighted sum of these counts yields an approximate matching score.

Let $n_{ij}(X)$ denote the element n from $<p,n,d>_j$, the $j^{th}$ bin entry of histogram $H_i(X)$, and let $c_h(n_{ij}(X))$ denote the element n for the $h^{th}$ child bin of that entry, $1 \leq h \leq k$. Similarly, let $d_{ij}(X)$ refer to the element d from the same triple. Given point sets X and Y, we compute the matching score via their pyramids $\Psi(X)$ and $\Psi(Y)$ as follows:

$$C(\Psi(X), \Psi(Y)) = \sum_{i=0}^{L-1} \sum_{j=1}^{k^i} w_{ij} \left[ \min(n_{ij}(X), n_{ij}(Y)) - \sum_{h=1}^{k} \min(c_h(n_{ij}(X)), c_h(n_{ij}(Y))) \right] \quad \text{Eq. (10)}$$

The outer sum loops over the levels in the pyramids; the second sum loops over the bins at a given level, and the innermost sum loops over the children of a given bin. The first min term reflects the number of matchable points in the current bin, and the second min term tallies the number of matches already counted at finer resolutions (in child bins). Note that as the leaf nodes have no children, when I=L−1 the last sum is zero. All matches are new at the leaves. The matching scores are normalized according to the size of the input sets in order to not favor larger sets. The number of new matches calculated for a bin is weighted by $w_{ij}$, an estimate of the distance between points contained in the bin. With a VG pyramid match there are two alternatives for the distance estimate: (a) weights based on the diameters of the pyramid's bins, or (b) input-dependent weights based on the maximal distances of the points in the bin to its center. Option (a) is a conservative estimate of the actual inter-point distances in the bin if the corpus of features used to build the pyramid is representative of the feature space. Its advantages are that it provides a guaranteed Mercer kernel (see below) and eliminates the need to store a distance d in the entry triples. Option (b)'s input-specific weights estimate the distance between any two points in the bin as the sum of the stored maximal to-center distances from either input set: $w_{ij} = d_{ij}(X) + d_{ij}(Y)$. This weighting gives a true upper bound on the furthest any two points could be from one another, and it has the potential to provide tighter estimates of inter-feature distances (as we confirm experimentally below), however, we do not have a proof to guarantee this weighting will yield a Mercer kernel.

Just as we encode the pyramids sparsely, we derive a means to compute intersections in Eq. 10 without ever traversing the entire pyramid tree. Given two sparse lists $H_i(X)$ and $H_i(Y)$ which have been sorted according to the bin indices, we obtain the minimum counts in linear time by moving pointers down the lists and processing only those nonzero entries that share an index, making the time required to compute a matching between two pyramids $O(mL)$. A key aspect of our method is that we obtain a measure of matching quality between two point sets without computing pair-wise distances between their features, an $O(m^2)$ savings over suboptimal greedy matchings. Instead, we exploit the fact that the points' placement in the pyramid reflects their distance from one another. The only inter-feature distances computed are the kL distances need to insert a point into the pyramid, and this small one-time cost is amortized every time we re-use a pyramid embedding to approximate another matching against a different point set.

We described the idea of using histogram intersection to count implicit matches in a multiresolution grid above. However, bins are constructed to uniformly partition the space, bin diameters exponentially increase over the levels, and intersections are weighted indistinguishably across an entire level. In contrast, here we have developed a pyramid embedding that partitions according to the distribution of features, and weighting schemes that allow more precise approximations of the inter-feature costs. As we will describe below, our VG pyramid match remains accurate and efficient even for high-dimensional feature spaces, while the uniform-bin pyramid match is limited in practice to relatively low-dimensional features.

For the increased accuracy our method provides, there are some complexity trade-offs versus the pyramid matching method, which does not require computing any distances to place the points into bins; their uniform shape and size allows points to be placed directly via division by bin size. On the other hand, sorting the bin indices with the VG method has a lower complexity, since the integer values only range to k, the branch factor, which will typically be much smaller than the feature aspect ratio that bounds the range in the pyramid matching method. In addition, in practice the cost of extracting an explicit correspondence field using the uniform-bin pyramid in high dimensions approaches the cubic cost of the optimal measure, whereas it remains linear with the proposed approach, assuming features are not uniformly distributed.

This approximation technique can be used to compare sets of vectors in any case where the presence of lowcost correspondences indicates their similarity (e.g., nearest-neighbor retrieval). We can also employ the measure as a kernel function for structured inputs. According to Mercer's theorem, a kernel is p.s.d if and only if it corresponds to an inner product in some feature space.

We can re-write Eq. 10 as:

$$C(\Psi(X), \Psi(Y)) = \sum_{i=0}^{L-1} \sum_{j=1}^{k^2} (w_{ij} - p_{ij}) \min(n_{ij}(X), n_{ij}(Y)),$$

where $p_{ij}$ refers to the weight associated with the parent bin of the $j^{th}$ node at level i. Since the min operation is p.d. as described by F.Odone et al in the article "Building Kernels from Binary Strings for Image Matching", IEEE Transactions on Image Processing, 14(2):169-180, February 2005, and since kernels are closed under summation and scaling by a positive constant as described by J. Shawne-Taylor and N. Cristianini in "Kernel Methods for Pattern Analysis", Cambridge Press, 2004, we have that the VG pyramid match is a Mercer kernel if $w_{ij} \geq p_{ij}$. This inequality holds if every child bin receives a similarity weight that is greater than its parent bin, or rather that every child bin has a distance estimate that is less than that of its parent. Indeed this is the case for weighting option (a), where $w_{ij}$ is inversely proportional to the diameter of the bin. It holds by definition of the hierarchical clustering: the diameter of a subset of points must be less than or equal to the diameter of all those points. We cannot make this guarantee for weighting option (b).

In addition to scalar matching scores, we can optionally extract explicit correspondence fields through the pyramid. In this case, the VG pyramid decomposes the required matching computation into a hierarchy of smaller matchings. Upon encountering a bin with a nonzero intersection, the optimal matching is computed between only those features from the two sets that fall into that particular bin. All points that are used in that per-bin matching are then flagged as matched and may not take part in subsequent matchings at coarser resolutions of the pyramid.

To test demonstrate our matching's accuracy and efficiency on real data, and we compare it to a pyramid match using a uniform partitioning of the feature space. In addition to directly evaluating the matching scores and correspondence fields, we show that our method leads to improved object recognition performance when used as a kernel within a discriminative classifier. We extracted local SIFT features from images in the ETH-80 database, producing an unordered set of about m=256 vectors for every example. In this case, F is the space of SIFT image features. We sampled some features from 300 of the images to build the VG pyramid, and 100 images were used to test the matching. In order to test across varying feature dimensions, we also used some training features to establish a PCA subspace that was used to project features onto varying numbers of bases. For each feature dimension, we built a VG pyramid with k=10 and L=5, encoded the 100 point sets as pyramids, and computed the pair-wise matching scores with both our method and the optimal least-cost matching.

Figure 20:
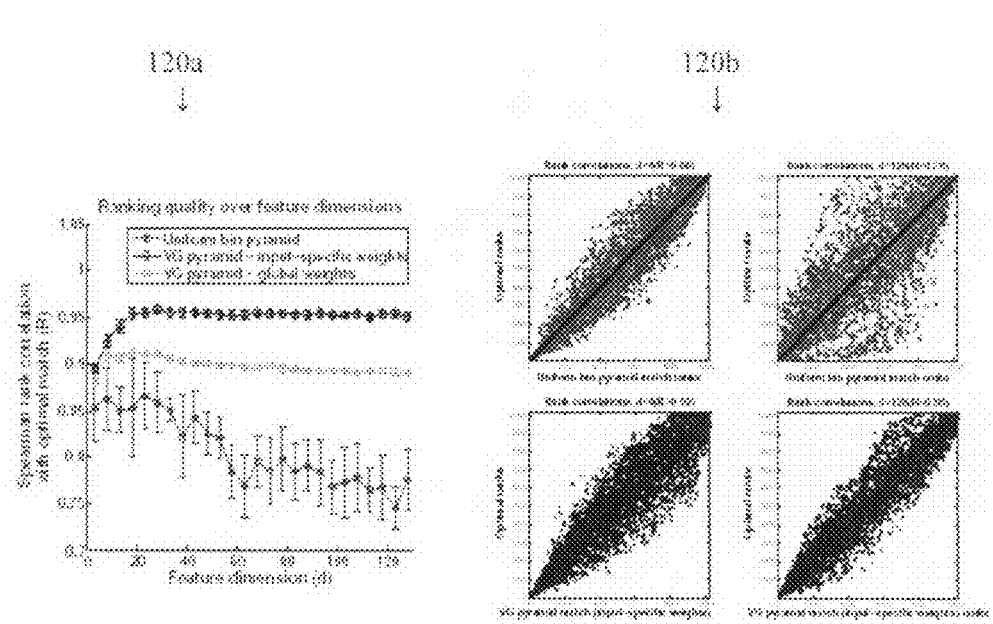
FIG. 20 is a comparison of optimal and approximate matching rankings on image data.

If our measure is approximating the optimal matching well, we should find the ranking we induce to be highly correlated with the ranking produced by the optimal matching for the same data. In other words, the images should be sorted similarly by either method. Spearman's rank correlation coefficient R provides a good quantitative measure to evaluate this:

$$R = 1 - \frac{6 \sum_{1}^{N} D^2}{N(N^2 - 1)},$$

where D is the difference in rank for the N corresponding ordinal values assigned by the two measures. The left plot 120a in FIG. 20 shows the Spearman correlation scores against the optimal measure for both our method (with both weighting options) and the approximation for varying feature dimensions for the 10,000 pair-wise matching scores for the 100 test sets. Due to the randomized elements of the algorithms, for each method we have plotted the mean and standard deviation of the correlation for 10 runs on the same data.

Shown in FIG. 20 is a comparison of optimal and approximate matching rankings on image data. The left plot 120a shows the set rankings produced with the VG pyramid match are consistently accurate for increasing feature dimensions, while the accuracy of an alternative approach based on uniform bins degrades about linearly in the feature dimension. The right plots 120b shows example rankings for both approximations at d=[8, 128]. While the VG pyramid match remains consistently accurate for high feature dimensions (R=0.95 with input-specific weights), the accuracy of the uniform bins degrades rapidly for dimensions over 10. The ranking quality of the input-specific weighting scheme (diamonds) is somewhat stronger than that of the "global" bin diameter weighting scheme (squares). The four plots 120b on the right of FIG. 20 display the actual ranks computed for both approximations for two of the 26 dimensions summarized in the left plot 120a. The diagonals denote the optimal performance, where the approximate rankings would be identical to the optimal ones; higher Spearman correlations have points clustered more tightly along this diagonal. For the low-dimensional features, the methods perform fairly comparably; however, for the full 128-D features, the VG pyramid match is far superior (rightmost column). The optimal measure requires about 1.25 s per match, while our approximation is about 2500× faster at 5×10$^{-4}$ s per match. Computing the pyramid structure from the feature corpus took about three minutes in Matlab; this is a one-time offline cost.

Figure 21:
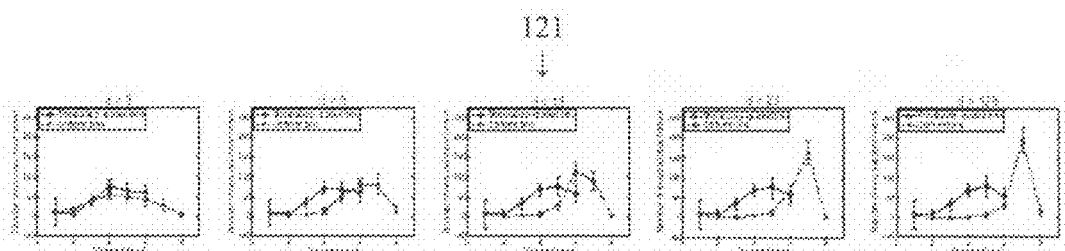
FIG. 21 shows a number of graphs of new matches formed at each pyramid level for either uniform (dashed) or VG (solid) bins for increasing feature dimensions.

For a pyramid matching to work well, the gradation in bin sizes up the pyramid must be such that at most levels of the pyramid we can capture distinct groups of points to match within the bins. That is, unless all the points in two sets are equidistant, the bin placement must allow us to match very near points at the finest resolutions, and gradually add matches that are more distant at coarser resolutions. In low dimensions, both uniform or data-dependent bins can achieve this. In high dimensions, however, uniform bin placement and exponentially increasing bin diameters fail to capture such a gradation: once any features from different point sets are close enough to match (share bins), the bins are so large that almost all of them match. The matching score is then approximately the number of points weighted by a single bin size. In contrast, because our method tailors the feature space partitions to the distribution of the data, even in high dimensions we will have a gradual increase in bin size across levels, and in effect will obtain more discriminating implicit matches. FIG. 21 confirms this intuition, again using the ETH-80 image data from above.

FIG. 21 shows a number of graphs 121 of new matches formed at each pyramid level for either uniform (dashed) or VG (solid) bins for increasing feature dimensions. Points represent mean counts per level for 10,000 matches. In low dimensions, both partition styles gradually collect matches up the pyramid. In high dimensions with uniform partitions, points begin sharing a bin "all at once"; in contrast, the VG bins still accrue new matches consistently across levels since the decomposition is tailored to where points cluster in the feature space.

For the same image data, we ran the explicit matching variant of our method and compared the correspondences between features induced to those produced by the globally optimal measure. For comparison, we also applied the same variant to pyramids with uniform bins. We measure the error of an approximate matching $\hat{\pi}$ by the sum of the errors at every link in the field:

$$E(M(X,Y;\hat{\pi}), M(X,Y;\pi^*)) = \sum_{x_i \in X} \|y_{\hat{\pi}_i} - y_{\pi_i^*}\|_2$$

Figure 22:
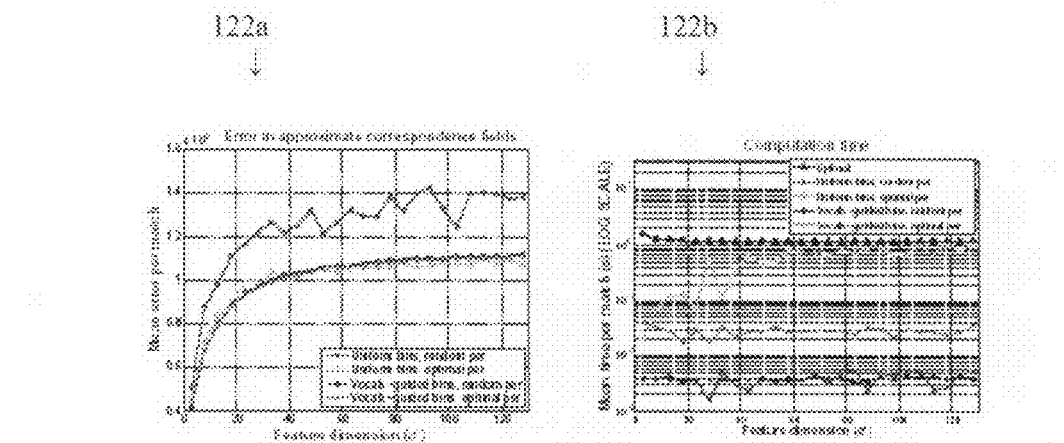
FIG. 22 shows a comparison of correspondence field errors and associated computation times for the VG and uniform pyramids.

FIG. 22 shows a comparison of correspondence field errors in graph 122a and associated computation times in graph 122b for the VG and uniform pyramids. Note that errors level out with d for all methods due to PCA. For each approximation, there are two variations tested: in one, an optimal assignment is computed for all points in the same bin; for the other, a random assignment is made. The left graph 122a shows the mean error per match for each method, and the right graph 122b shows the corresponding mean time required to compute those matches. The computation times are as we would expect: the optimal matching is orders of magnitude more expensive than the approximations. Using the random assignment variation, both approximations have negligible costs, since they simply choose any combination of points within a bin. It is important to note that in high dimensions, the time required by the uniform bin pyramid with the optimal per-bin matching approaches the time required by the optimal matching itself. This occurs for similar reasons as the poorer matching score accuracy exhibited by the uniform bins, both in the left plot and above in FIG. 20; since most or all of the points begin to match at a certain level, the pyramid does not help to divide-and-conquer the computation, and for high dimensions, the optimal matching in its entirety must be computed. In contrast, the expense of the VG pyramid matching remains steady and low, even for high dimensions, since data-dependent pyramids better divide the matching labor into the natural segments in the feature space.

For similar reasons, the errors are comparable for the optimal per-bin variation with either the VG or uniform bins. The VG bins divide the computation so it can be done inexpensively, while the uniform bins divide the computation poorly and must compute it expensively, but about as accurately. Likewise, the error for the uniform bins when using a per-bin random assignment is very high for any but the lowest dimensions (line on left plot), since such a large number of points are being randomly assigned to one another. In contrast, the VG bins actually result in similar errors whether the points in a bin are matched optimally or randomly (see lines on left plot). This again indicates that tuning the pyramid bins to the data's distribution achieves a much more suitable breakdown of the computation, even in high dimensions.

Figures 23, 23A:
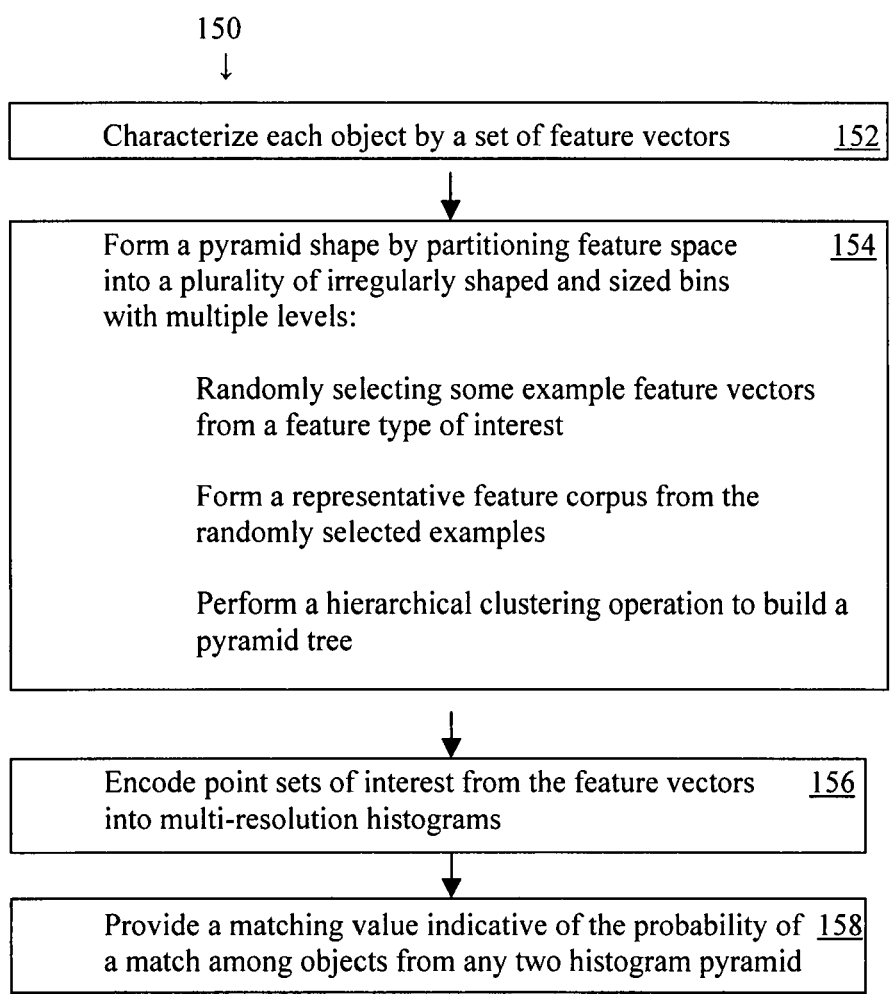
FIG. 23 shows a table that shows our improvements over the uniform-bin pyramid match kernel.
FIG. 23A shows a flow diagram implementing a vocabulary guided pyramid matching technique.

We have experimented with the VG pyramid match within a discriminative classifier for an object recognition task. We trained an SVM with our matching as the kernel to recognize the four categories in the Caltech-4 benchmark data set. We trained with 200 images per class and tested with all the remaining images. We extracted features using both the Harris and Maximally Stable Extremal Region detectors as described by J. Matas et al in the article entitled "Robust Wide Baseline Stereo from Mazimally Stable Extremal Regions", British Machine Vision conference, Cardiff UK, September 2002 and the 128-D SIFT descriptor as described by D. Lowe in the article "Distinctive Image Features from Scale-Invariant Keypoints", International Journal of Computer Vision, 60(2):91-110, January 2004. We also generated lower-dimensional (d=10) features using PCA. To form a Mercer kernel, the weights were set according to each bin diameter $A_{ij}$: $w_{ij}=e^{-A_{ij}/\sigma}$, with $\sigma$ set automatically as the mean distance between a sample of features from the training set. The table in FIG. 23 shows our improvements over the uniform-bin pyramid match kernel. The results show the VG pyramid match is more accurate and requires minor additional computation. Our near-perfect performance on this data set is comparable to that reached by others in the literature; the real significance of the result is that it distinguishes what can be achieved with a VG pyramid embedding as opposed to the uniform histograms used in the pyramid match kernel, particularly for high-dimensional features. In addition, here the optimal matching requires 0.31 s per match, over 500× the cost of our method.

Referring now to FIG. 23A, a flow chart is shown to implement the above described vocabulary guided pyramid match technique 150 on computer 18. As shown in step 152, each object is characterized by a set of feature vectors. As shown in step 154, feature space is partitioned into a plurality of irregularly shaped and sized bins with multiple levels and forming a pyramid shape wherein some example feature vectors are randomly selected from a feature type of interest, a representative feature corpus is formed from the randomly selected examples and a hierarchical clustering operation is performed to build a pyramid tree. Point sets of interest are encoded from the feature vectors into multi-resolution histograms as shown in step 156. Finally, as shown in step 158, a matching value is provided indicative of the probability of a match among objects from any two histogram pyramids.

The flow diagram does not depict the syntax of any particular programming language. Rather, the flow diagrams herein illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described are unordered meaning that, when possible, the steps can be performed in any convenient or desirable order implementing the concepts as described herein.

It should now be appreciated that we have described a linear-time method to compute a matching between point sets that takes advantage of the underlying structure in the feature space and remains consistently accurate and efficient for high-dimensional inputs on real image data. Our results demonstrate the strength of the approximation empirically, compare it directly against an alternative state-of-the-art approximation, and successfully use it as a Mercer kernel for an object recognition task. We have commented most on potential applications in vision and text, but in fact it is a generic matching measure that can be applied whenever it is meaningful to compare sets by their correspondence.

Hashing Algorithm

Having described various embodiments and features of the invention, we will now describe a hashing algorithm which may used with the above described techniques. Matching local features across images is often useful when comparing or recognizing objects or scenes, and efficient techniques for obtaining image-to-image correspondences have been developed. However, given a query image, searching a very large image database with such measures remains impractical. We introduce a sublinear time randomized hashing algorithm for indexing sets of feature vectors under their partial correspondences. We developed an efficient embedding function for the normalized partial matching similarity between sets, and show how to exploit random hyperplane properties to construct hash functions that satisfy locality-sensitive constraints. The result is a bounded approximate similarity search algorithm that finds $(1+\epsilon)$-approximate nearest neighbor images in $O(N^{1/(1+\epsilon)})$ time for a database containing N images represented by (varying numbers of) local features. By design the indexing is robust to outlier features, as it favors strong one-to-one matchings but does not penalize for additional distant features. We demonstrate our approach applied to image retrieval for images represented by sets of local appearance features, and show that searching over correspondences is now scalable to large image databases.

Representations that decompose images into local patches or regions have proven to be very useful, in large part due to their tendency to be preserved under a variety of imaging conditions and transformations. To leverage local representations when performing image-to-image comparisons, many effective retrieval and object recognition algorithms evaluate similarity by establishing correspondences (or a matching) between sets of local parts. As advances are made in terms of powerful representations and sophisticated matching techniques, it is critical to consider how they might scale to accommodate image retrieval with very large databases and recognition with a very large number of categories or exemplars. If a retrieval system is to index all of the images on the web by their visual content, it cannot conceivably operate with a naive linear scan, where a matching is computed between a query and every image in the database. Likewise, if a recognition engine based on correspondences is to ever cope with the thousands of categories humans easily recognize, it must not require that a novel input be matched against every stored exemplar for all categories. Although researchers have developed the means to perform each individual matching efficiently, indexing over those correspondences remains a significant computational challenge. While various tree data structures have been explored to efficiently index features or key points themselves, existing methods are limited to handling only these single vector inputs, and because they index features independently, do not allow us to evaluate one-to-one matchings. We present a sub-linear time randomized hashing algorithm for indexing sets of feature vectors according to their partial correspondences. We construct an embedding and locality-sensitive hash functions under which feature sets can be efficiently indexed, with guarantees on the expected error induced by the approximation relative to the significant gains in query speed we achieve. Specifically, we find the $(1+\epsilon)$-approximate nearest neighbor images in $O(N^{1/(1+\epsilon)})$ time for a database containing N images, each of which is represented by a set of local features. The matching effected is partial and robust: images may be described by varying numbers of features, and the presence of very distant ("outlier") features in an image cannot significantly skew the correspondence similarity that is measured for an otherwise good match. We demonstrate our approach for image retrieval tasks with large image databases, and show that for very little loss in accuracy over a brute force linear scan, we obtain significant computational advantages—typically, only 1-3% of a database needs to be searched. In our experiments we have focused on image matching with local appearance features; however, the approach is general and applies to any set-based representation where correspondences are a meaningful comparison measure. Beyond content-based image retrieval itself, the sub-linear time search tool we provide has potential applications to recognition with exemplars and other example-based learning problems where a large amount of training data is valuable.

In contrast to previous techniques, our embedding allows input feature sets to have varying cardinalities, and provides for hashing over a normalized partial match. This is an important advantage for handling outlier "unmatchable" features, as we will demonstrate hereinbelow. In addition, unlike previous techniques, with our hashing algorithm it is possible to perform the feature space decomposition according to its underlying structure, which means indexing can remain accurate even for sets with high-dimensional features.

Several researchers have considered special tree data structures to organize image feature vectors for fast access. These approaches share our goal of realizing rapid image-based search. However, they address the problem of how, given a feature vector, to efficiently retrieve the most similar feature vectors among a pool of feature vectors, with similarity defined in terms of Euclidean distance. In contrast, we are concerned with the problem of how, given a set of feature vectors, to efficiently retrieve the most similar sets from a database of sets, with similarity defined in terms of one-to-one correspondences (a matching). For example, while the bag-of-words representation from the article entitled "Scalable Recognition with a Vocabulary Tree" by D. Nister and H. Stewenius, CVPR, 2006 describes quantized features jointly, unlike our approach it does not allow a partial match and cannot formally guarantee sub-linear time image search without assumptions about the frequency with which features will occur in query images. In addition, the previous approaches are intended for accessing images that contain instances of the same object, a scenario where identifying a few very similar features has been shown to be sufficient to reach stored images of the same object. Our framework applies to general matchings not only between object instances, but also between textures or categories, which often exhibit stronger appearance variation and may not be isolated from a database on the basis of a few discriminative features alone. Instead, the joint matching of all component features may be preferable and such matchings have been shown to yield good category level comparisons.

The technique is a novel embedding for a set of vectors that enables sub-linear time approximate similarity search over partial correspondences with random hyperplane hash functions. The idea is to encode a point set with a weighted multi-resolution histogram in such a way that a dot product between any two such encodings will reflect the similarity of the original point sets according to an approximate, normalized partial matching between their component feature vectors. Then, by drawing on a property of random hyperplanes, we designate randomized hash functions which guarantee that examples with strong matching similarity will (with high probability) hash into the same buckets. Approximate similarity search in the Hamming space of the hash keys then identifies the approximate nearest neighbors according to the approximate matching score, in sub-linear time in the number of database examples.

In image retrieval terms, this means we first take a collection of images, each one of which is represented in some fashion by a set of feature vectors. For example, each could be described by a set of SIFT descriptors extracted at salient points, or a set of shape context histograms or geometric blur descriptors extracted at edge points, or a set of color distributions, etc. The database items are prepared by mapping every set of vectors to a single high-dimensional vector via the embedding function. After this embedding, the dot product between any two examples would reflect the partial matching similarity between the original feature sets, that is, the strength of the correspondence between their local parts. All embedded database examples are next encoded as binary hash key strings, with each bit determined with a random hash function designed to probabilistically give similar responses for examples with similar dot products. These hash keys are stored in such a way that they are accessible in sub-linear time. Given a query image, local features of the chosen type are extracted, and the embedding function is applied to form the vector encoding for the query set. Then, rather than compute the dot product between the embedded query and every embedded database item, we apply the same randomized hash functions used for the database items to index into the stored database hash keys, thereby (with high probability) obtaining in sub-linear time the most similar database neighbors in terms of normalized partial match correspondences between the original local image features. See FIG. 24 for a schematic overview of our approach.

Figure 24:
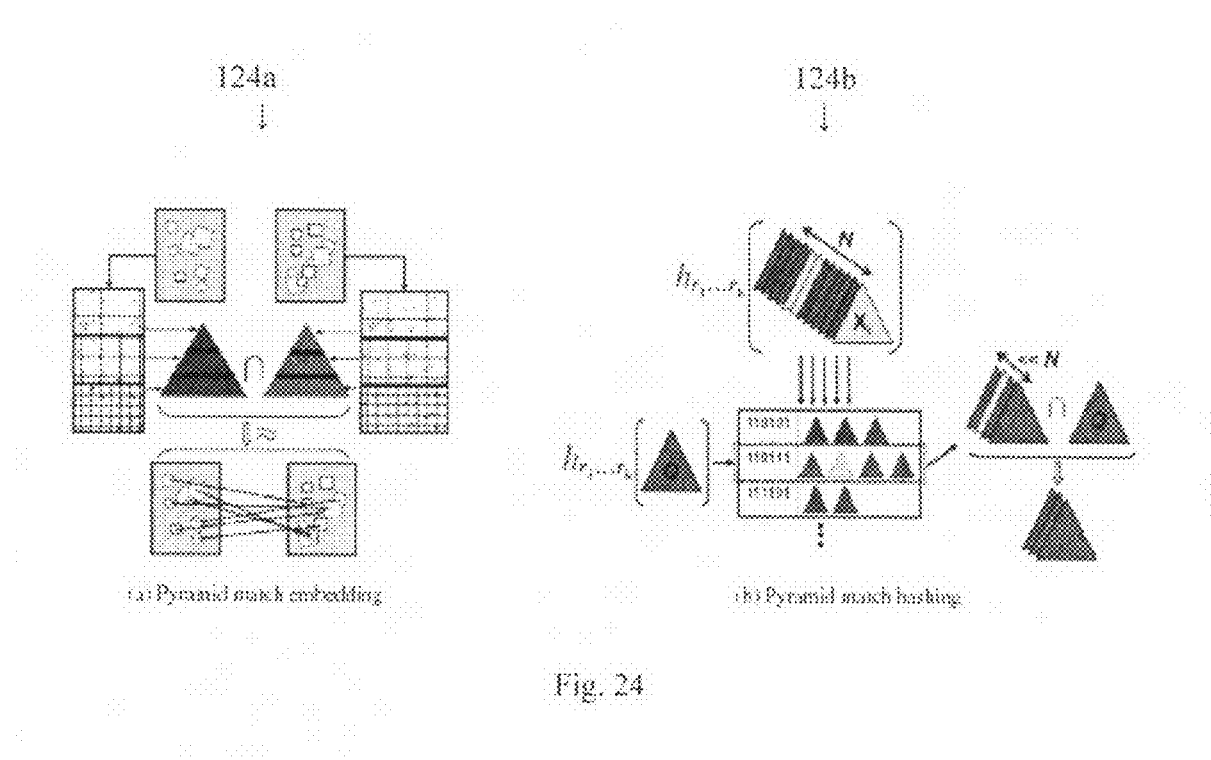
FIG. 24 shows a schematic of a pyramid match hashing technique.

As shown in FIG. 24, a pyramid match 124a takes two sets of feature vectors as input (for instance, two sets of image patch descriptors), maps the vectors to multi resolution histograms, and intersects them to efficiently approximate the optimal partial matching (correspondence) between the original feature sets. As described above, the pyramid match 124a intersects histograms pyramids over sets of features, approximating the optimal correspondences between the sets' features. Vectors describing the appearance or shape within local image patches can be used to form a feature set for each image and the pyramid match 124a approximates the similarity according to a partial matching in that feature space. The feature space can be any local description of a data object, images or otherwise and for images the features typically will not simply be the spatial image coordinates. Our novel pyramid match hashing technique 124b with embedding of the pyramid match and associated random hash functions allow sub-linear time indexing over correspondences; the pyramid match is applied only to a small portion of the database examples, but we still obtain a specified retrieval accuracy with high probability.

Let's consider point sets from the input space S, which contains sets of vectors drawn from feature space F: $S=\{X|X=\{x_1, \ldots, x_m\}\}$, where each feature is a d-dimensional vector $x_i \in F \subseteq \overline{R^d}$, and $m=|X|$.

A partial matching between two point sets is an assignment that maps all points in the smaller set to some subset of the points in the larger (or equally-sized) set. Given point sets X and Y, where $m=|X|$, $n=|Y|$, and $m \leq n$, a partial matching $M(X,Y;\pi)=\{(x_1,y_{\pi_1}), \ldots, (x_m,y_{\pi_m})\}$ pairs each point in X to some unique point in Y according to the permutation of indices specified by $\pi=[\pi_1, \ldots, \pi_m]$, $1 \leq \pi_i \leq n$, where $\pi_i$ specifies which point $y_{\pi_i} \in Y$ is matched to $x_i \in X$, for $1 \leq i \leq m$. The cost of a partial matching is the sum of the distances between matched points:

$$C(M(X, Y; \pi)) = \sum_{x_i \in x} \|x_i - y_{\pi_i}\|_1.$$

The optimal partial matching $M(X,Y;\pi^*)$ uses the assignment $\pi^*$ that minimizes the matching cost:

$$\pi^* = \arg\min_{\pi} C(M(X, Y; \pi)) \qquad \text{Eq. (11)}$$

Given a database of feature sets $D=\{X_1, \ldots, X_N\} \subset S$, and a query set of features $Q \in S$, the nearest neighbor in D in terms of correspondences is the set $R^*$ that has the minimal partial matching cost to Q:

$$R^* = \arg\min_{X_i, 1 \leq i \leq N} C(M(Q, X_i; \pi^*)) \qquad \text{Eq. (12)}$$

Let $C=C(M(Q,R^*;\hat{\pi}^*))$, where $\hat{\pi}^*$ refers to a bounded approximation for $\pi^*$. In this work we develop a sub-linear time hashing algorithm that guarantees retrieval in $O(N^{(1/1+\epsilon)})$ time of an approximate nearest-neighbor $\hat{R}$ for Q such that $C((M(Q,\hat{R};\pi^*)) \leq (b\ 1+\epsilon)C$.

To construct our embedding for sub-linear time hashing over correspondences, we build upon the matching technique as described above where the pyramid match is a low distortion approximation for the least-cost correspondence between two sets of vectors that requires only linear time in the number of vectors per set to compute. As described above, point sets are converted to multi-resolution histograms (pyramids): $\Psi(X)=[H_0(X), \ldots, H_{L-1}(X)]$, where $X \in S$, $L=\lceil \log_2 A \rceil$, is the feature value range, $H_i(X)$ is a histogram vector formed over points in X using d-dimensional bins of side length $2^i$. Note, non-uniformly shaped bins are also possible, and may be formed by hierarchical clustering on a corpus of features. These pyramids are represented sparsely, with up to $m=|X|$ nonzero entries per level.

The (un-normalized) pyramid match score is defined as:

$$\tilde{P}_\Delta(\Psi(Y), \Psi(Z)) = w_{L-1} I_{L-1} + \sum_{i=0}^{L-2} (w_i - w_{i+1}) I_i \qquad \text{Eq. (13)}$$

Where Y, $Z \in S$, and $I_i$ is the intersection between the $i^{th}$ histogram in $\Psi(Y)$ and $\Psi(Z)$, respectively. To measure matching similarity, the weights $w_i$ are set to be inversely proportional to the size of the histogram bins at level i, with the constraint that $w_i \geq w_{i+1}$ (e.g., $w_i = 1/2^i$ is a valid option).

To avoid favoring large sets and to form a measure that respects the triangle inequality, we will consider the pyramid match value normalized by the product of each input's self-similarity:

$$P_\Delta(\Psi(Y), \Psi(Z)) = \frac{P_\Delta(\Psi(Y), \Psi(Z))}{\sqrt{\tilde{P}_\Delta(\Psi(Y), \Psi(Y)) \times \tilde{P}_\Delta(\Psi(Z), \Psi(Z))}} \qquad \text{Eq. (14)}$$

The pyramid match will serve as our approximation to the optimal partial matching ($\hat{\pi}^*$). Below we show an embedding for the pyramid match and the locality-sensitive hashing functions that will allow sub-linear time nearest neighbor search on top of it.

A locality sensitive hashing techniques is a distribution on a family F of hash functions operating on a collection of objects, such that for two objects x, y, $$\Pr_{h \in F}[h'(x) = h(y)] = sim(x, y) \quad \text{Eq. (15)}$$

where sim(x, y) is some similarity function defined on the collection of objects. In other words, the probability that two inputs collide in the hash table is equal to the similarity between them, and so highly similar objects will be indexed by the hash table with high probability. Such a hashing scheme has been shown to support efficient data structures for performing approximate nearest-neighbor queries on a database of objects, when hash functions that are appropriate for both the data objects and similarity function of interest can be defined.

The article "Improved Approximation Algorithms for Maximum Cut and Satisfiability Problems Using Semidefinite Programing" by Goemans and Williamson, JACM, 42(6): 1115-1145, 1995 described a randomized algorithm for the MAX-CUT problem using semidefinite programming. As part of this work, they prove that given a collection of vectors $\{\vec{v}_1, \ldots, \vec{v}_n\}$ belonging to the unit sphere, and a randomly generated vector $\vec{r}$, the probability that any two vectors $\vec{v}_i$ and $\vec{v}_j$ each has a dot product with $\vec{r}$ having an opposite sign is related to the vectors as follows:

$$Pr[sgn(\vec{v}_i \cdot \vec{r}) \neq sgn(\vec{v}_j \cdot \vec{r})] = \frac{1}{\pi} \cos^{-1}(\vec{v}_i \cdot \vec{v}_j) \quad \text{Eq. (16)}$$

That is, the probability a random hyperplane separates two vectors is directly proportional to the angle $\cos^{-1}(\vec{v}_i \cdot \vec{v}_j)$.

The article by Charikar entitled "Similarity Estimation Techniques from Rounding Algorithms", Proceedings of the 34th Annual ACM Symposium on Theory of Computing, 2002, considers how this property may be exploited for locality sensitive hashing. Given a database of vectors in $R^d$, a vector $\vec{r}$ is chosen at random from the d-dimensional Gaussian distribution with zero mean and unit variance. The corresponding hash function $h_{\vec{r}}$ accepts a vector $\vec{u} \in R^d$, and is defined as:

$$h_{\vec{r}}(\vec{u}) = \begin{cases} 1, & \text{if } \vec{r} \cdot \vec{u} \geq 0 \\ 0, & \text{if } \vec{r} \cdot \vec{u} < 0 \end{cases} \quad \text{Eq. (17)}$$

Then, drawing on the relationship in Eq. 16, a valid locality sensitive hashing scheme is:

$$Pr[h_{\vec{r}}(\vec{v}_i) = h_{\vec{r}}(\vec{v}_j)] = 1 - \frac{\theta(\vec{v}_i, \vec{v}_j)}{\pi}, \text{ where} \quad \text{Eq. (18)}$$

$$\theta(\vec{v}_i, \vec{v}_j) = \cos^{-1}\left(\frac{(\vec{v}_i \cdot \vec{v}_j)}{\sqrt{|\vec{v}_i||\vec{v}_j|}}\right)$$

In the following, we show that we can achieve hashing over the pyramid match kernel with this hash function family. We developed an embedding function for the pyramid mapping $\Psi(X)$ of point set X that incorporates the weights and computation of the pyramid matching $P_\Delta$. When considered as a type of unary encoding, we have an embedding for each point set that under a dot product yields the unnormalized pyramid match similarity value.

Given a histogram H that contains r bins, and a weight w, let [wH] denote an r-dimensional vector giving the counts in each bin of the histogram, with each count scaled by w. Note that this weighting is distributive over histogram intersection; that is, a weighted histogram intersection value is equivalent to the intersection of the weighted histograms, or wI(H(Y),H(Z))=I([wH(Y)],[wH(Z)]).

Let U([wH]) denote the following (padded) unary encoding of the histogram H weighted by w:

$$U([wH]) = \left(\underbrace{\overbrace{1, \ldots, 1}^{wH^{(1)}}, \overbrace{0, \ldots, 0}^{P-wH^{(1)}}}_{\text{first bin}}, \ldots, \underbrace{\overbrace{1, \ldots, 1}^{wH^{(r)}}, \overbrace{0, \ldots, 0}^{P-wH^{(r)}}}_{\text{last bin}}\right), \quad \text{Eq. (19)}$$

where P is the maximum possible weighted count in any histogram bin, and $H^{(j)}$ is the count in bin j of H. Note if weighted counts are real-valued, this process can in theory proceed by scaling to a given precision and truncating to integers. With the normalization factor also scaled, the output remains equivalent. However, as described below, the unary encoding is never explicitly computed. Let $v_i(X)$ refer to the histogram for set X at pyramid level i, weighted by $w=w_i-w_{i+1}$: $v_i(X)=[(w_i-w_{i+1})H_i(X)]$.

The following embedding f serves to map the set of vectors X to a single vector:

$$f(X) = [U(v_0(X)), U(v_1(X)), U(v_2(X)), \ldots, U(v_{L-2}(X)), U([w_{L-1}H_{L-1}(X)])] \quad \text{Eq. (20)}$$

The dot product between two such encodings for sets Y and Z yields the un-normalized pyramid match score from Eq. 13 above:

$$f(Y) \cdot f(Z) = \tilde{P}_\Delta(\Psi(Y), \Psi(Z)) \quad \text{Eq. (21)}$$

The length $|f(Y)|$ of an encoding vector $f(Y)$ is simply the sum of its total number of nonzero (one) entries. Since self-intersection of a histogram returns the number of total points in the histogram ($I(H(Y), H(Y))=|Y|$), the length of an embedding vector will be equivalent to the original set's self-similarity score under the pyramid match:

$$|f(Y)| = w_{L-1}|Y| + \sum_{i=0}^{L-2}(w_i - w_{i+1})|Y| \quad \text{Eq. (22)}$$

$$= \tilde{P}_\Delta(\Psi(Y), \Psi(Y))$$

Putting these pieces together, we have an embedding of the pyramid match kernel that allows us to perform sublinear time similarity search with random hyperplane hash functions. With the new embedding in Eq. 20 and the guarantee from Eq. 18, we have:

$$Pr[h_{\vec{r}}(f(Y)) = h_{\vec{r}}(f(Z))] = 1 - \frac{\theta(f(Y), f(Z))}{\pi}, \text{ where}$$

$$\theta(f(Y), f(Z)) = \cos^{-1}\left(\frac{f(Y) \cdot f(Z)}{\sqrt{|f(Y)||f(Z)|}}\right)$$

$$= \cos^{-1}(P_\Delta(\Psi(Y), \Psi(Z)))$$

Notice that this last term is the normalized pyramid match similarity value, where normalization is done according to the product of the self-similarity scores. Similar embeddings and hash functions are possible with the "vocabulary-guided" pyramid match as described above with approximate correspondences, since the intersected pyramids there too can be written as a dot product between weighted histograms. Because a vocabulary-guided pyramid uses irregularly shaped histogram bins, for that embedding weights must be applied at the level of the bins instead of at the level of the pyramid resolutions We do not need to explicitly expand the components $v_i(X)$ into their unary encodings. Likewise, we do not need to generate an entry for every dimension of the random vector F in Eq. 17 to compute a hash bit from f(X). Instead, the counts in $H_i(X)$ indicate which entries in $\vec{r}$ will result in a nonzero contribution to $\langle f(X) \cdot \vec{r} \rangle$, that is, those entries where the encoding for $v_i(X)$ would be 1, not 0. For those required entries only, we generate values in $\vec{r}$ on demand: we seed a random number generator relative to the index of the nonzero entry in f(X), obtain two uniform random numbers in [0,1], and then convert those to a normally distributed random number from N(0,1) using the Box-Muller transformation. The inner product between the random vector and the embedding is then the sum of those particular entries in $\vec{r}$, and the sign of this sum determines the hash key bit $h_{\vec{r}}(f(X))$.

To further improve the efficiency of computing hash key bits, rather than sample random Gaussian values for F repeatedly for each unit of a total weighted bin count V (i.e., each of V 1-bits), we draw directly from the sum of V Gaussians, which is normally distributed with mean $$\sum_{i=1}^{V} \mu_i = 0$$

and variance $$\sum_{i=1}^{V} \sigma_i^2 = V$$

(hence the $\sqrt{V_l}$ term in step 208 of the hashing algorithm 200 described below).

Using K random hash functions (that is, k independent instances of the vector $\vec{r}$ above), for each database set X we generate a k-dimensional binary hash key string that is the concatenation of the hash key bits that result from Eq. 17 with input $\vec{u}=f(x)$. Now the problem of indexing into the database with query set Q is reduced to hashing f(Q) with these same k functions and retrieving items corresponding to database bit vectors having minimal Hamming distances to the query bit vector. For this step, we employ the technique for approximate nearest neighbor search in Hamming space developed by Charikar as mentioned above, which guarantees that at most $O(N^{1/(1+\epsilon)})$ of the N bit vectors must be examined to retrieve the $(1+\epsilon)$-approximate nearest neighbors. Given the list of database hash keys, $M=O(N^{1/(1+\epsilon)})$ random permutations of the bits are formed, and each list of permuted hash keys is sorted lexicographically to form M sorted orders. A query hash key is indexed into each sorted order with a binary search, and the 2M nearest examples found this way are the approximate nearest neighbors. See Charikar as cited above for details. Having pulled up these nearest bit vectors, we then compute the actual pyramid match similarity values between their associated database pyramids and the query's pyramid. The retrieved neighbors are ranked according to these scores, and this ranked list is the final output of the algorithm. A useful property of our indexing approach is that adding to the database does not require recomputing the preprocessing steps; to add a new example to the database, its hash key is computed, permuted, and then inserted into the existing sorted orders.

Referring now to FIG. 25, a pseudocode diagram to implement the technique referred to as a hashing algorithm 200 and as described above using a digital computer 18 is shown. Starting with step 201, with a database of images $\{X_1, \ldots, X_N\}$ each with feature vectors $X_j=\{x_1, \ldots, x_{m_j}\}, x_i \in R^d:1:$ for all sets $X_j$, j=1, ..., N, perform the following steps. As shown in step 202, compute sparse multi resolution histogram $\Psi(X_j)$ and then weighted vector $f(X_j)$, represented sparsely as $\{\langle I,V \rangle | 1\}_{l=1}^{z}$ a list of d-dim. nonzero indices $I_l$ and their associated weighted counts $V_l$, with $Z=O(m_jL)$. Next, compute a hash key for each as shown in step 203. As shown in step 204, for all Hash functions $\vec{r}_i$, i=1, ..., k perform the following. As shown in step 205, generate next hash key bit:

$$h_{\vec{r}_i}(f(X_j)) = \begin{cases} 1, & \text{if } \sum_{l=1}^{z} \vec{r}_i^{(l)} \sqrt{V_l} \geq 0 \\ 0, & \text{otherwise} \end{cases}$$

where $\vec{r}_i^{(l)} \sim N(0,1)$ is the $\tau_l^{th}$ entry in random vector $\vec{r}_i$, generated via seeds relative to i and l.

As shown in step 206, continue the above process for each until a complete pass had been accomplished. Continue with step 207 where a concatenate k bits to form binary hash key: $\lfloor h_{\vec{r}_1}(f(X_j)), \ldots, h_{\vec{r}_k}(f(X_j)) \rfloor$ is accomplished. As shown in step 208, continue the above process for each until a complete pass had been accomplished. Continue with step 209 to process hash keys for Hamming space approximate-NN search according to Charikar as described above and generate $M=O(N^{1/(1+\epsilon)})$ random k-dimensional permutations, permute all database hash keys by each one, and sort each list of permuted keys. Next we query image represented by set of features Q. As shown in step 210, compute embedding f(Q) and hash key $\lfloor h_{\vec{r}_1}(f(Q)), \ldots, h_{\vec{r}_k}(f(Q)) \rfloor$ as in steps 202 and 203 above. Next apply each permutation to query hash key bits as shown in step 211. As shown in step 212, perform binary search on each sorted, permuted order of database hash keys, and collect the indices $[t_1 \ldots t_{2M}]$ corresponding to the database items' hash keys that are indexed in each. Finally, sort hashed examples according to $P_A(\Psi(Q), \Psi(X_{l_i}))$, for i=1, ..., 2M as shown in step 213 and the sub-routine has ended.

Normalized Partial Matches

To achieve a complete partial matching, where no penalty whatsoever is accumulated for unmatched features in a larger input set, it is necessary to normalize the matching cost only according to the size of the smaller set. However, the hashing described above makes use of a normalization factor that includes the sizes of both input sets. This yields a correspondence measure between two variable sized sets that does include some penalty for the unmatched points in the larger set, but remains robust to increasingly distant outlier features. For example, consider two sets; with the minimum cardinality normalization, their pyramid match score would remain constant if we were to add more and more features to one of the sets. In contrast, with the product normalization, the pyramid match value would slowly decrease as we added those features. At times this is a desired property for image matching. If there is expected to be an unknown amount of clutter, background, or unmatched features in both of the images being matched, this normalization is reasonable. The best matching will be the one that can find good matches for all the features in both sets. An image matching with more clutter (unmatchable features) will receive a lower similarity weight than an image matching with fewer unmatched features. However, pyramid match hashing will not care how different the unmatched features are to any features in the other set; that is, the penalty is only relative to how many unmatched features there are. We verified this property experimentally as described below. Which normalization approach is most suitable may depend on the application. We have shown how to perform sub-linear time hashing with the product normalization, and we have learned that it is not possible to do locality sensitive hashing with the alternative minimum cardinality normalization.

We evaluated our indexing technique in several ways. We first systematically test the pyramid match's robustness to outlying clutter features, and compared it against an alternate approximate matching approach. Then we demonstrate pyramid match hashing applied to image retrieval on different data sets.

Robust Matching. The degree to which the unmatchable (or "outlier") features differ from the matched features will not affect our matching scores, meaning that pyramid match hashing is robust to increasingly distant outlier features. In contrast, bijective matchings computed over feature sets that have been re-weighted to achieve total equal masses are not robust to increasingly distant outliers. In order to work with realistic data but still have control over the amount of clutter features, we established synthetic class models. Each model is comprised of some fixed number m' of parts, and each part has a Gaussian model that generates its d-dimensional appearance vector (in the spirit of the "constellation model" used by Fergus et al as described in the article "Object Class Recognition by Unsupervised Scale-Invariant Learning", CVPR, 2004 and others). Given these category models, we can then add clutter features and noise, simulating in a controlled manner the variations that occur with the patches extracted from real images. The appearance of the clutter features is determined the same range of values as the model features. We generated 50 examples for two synthetic category models, each of which was defined by a set of m'=35 features with d=2, for a total of 100 point sets. We computed pairwise similarities using the pyramid match normalized by the product of the input sets' cardinalities, pairwise similarities using the optimal partial matching and the same normalization, and pairwise distances based on the bijective matching approximation of Indyk and Thaper previously mentioned. To apply the bijective matching to unequally-sized sets, points in a set were weighted so that all weights summed to one.

Figure 26:
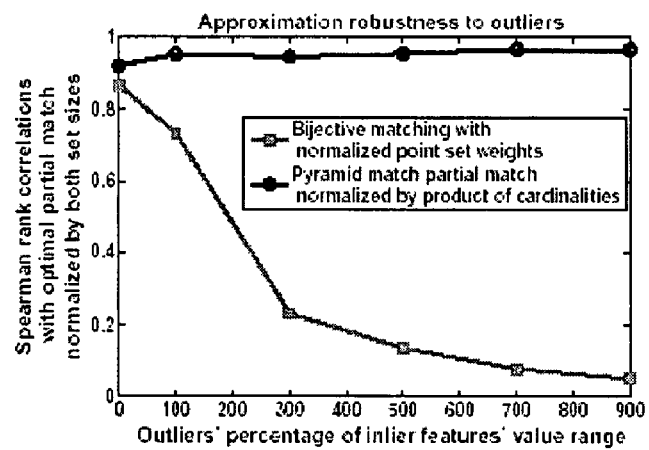
FIG. 26. is a plot showing approximation robustness to outliers.

Then we added to every set up to 100 clutter features having a value range bounded by a percentage Q of the inlier features' value range, and re-computed the resulting pairwise matching scores. We tested for values of Q ranging from 100% to 1000%, in increments of 200. (When Q=100%, the inlier and outlier features have the same value range.) FIG. 26 shows the results, with approximations' ranking quality quantified by the Spearman correlation coefficient. The two left-most points on the plot correspond to matchings with equally-sized sets and no clutter. The remaining points correspond to matchings with increasingly more distant clutter or outlier features. The match scores normalized by the sizes of both input sets remain robust to the addition of stronger outlier features (circles), whereas the bijective matching must incorporate the distance of the outlier features in its matching and suffers as that distance increases (squares).

Image Retrieval. We also tested our pyramid match hashing algorithm applied to content-based image retrieval where images are represented by sets of local SIFT image features. We considered two different data sets: the Caltech-4 database and the Caltech-101 database. In all experiments, we set $\epsilon=1.0$, which means that our query times are bounded by $O(\sqrt{N})$ for N images.

We measured our performance with several metrics: (1) the observed accuracy of the approximate-NN indexing, (2) the extent to which our hash functions are in practice locality-sensitive to the pyramid match, (3) the ranking of hashed database neighbors relative to the ranking we would obtain with a linear scan of all items, and (4) the relevance of examples retrieved via hashing, again relative to the results of a linear scan. Note precision-recall is not an appropriate error metric here due to the guarantees of the method, which are to retrieve some approximate-NN, not to rank all examples. For metrics (1) and (3) we display results with 'box and whisker plots': each box has lines at the lower quartile, median value, and upper quartile values, whiskers extend from each end of the box to show the extent of the rest of the data, and outliers are denoted with pluses. For metrics (2) and (4) we summarize the error/accuracy distributions in terms of $\mu$ and $\sigma$.

Figure 27:
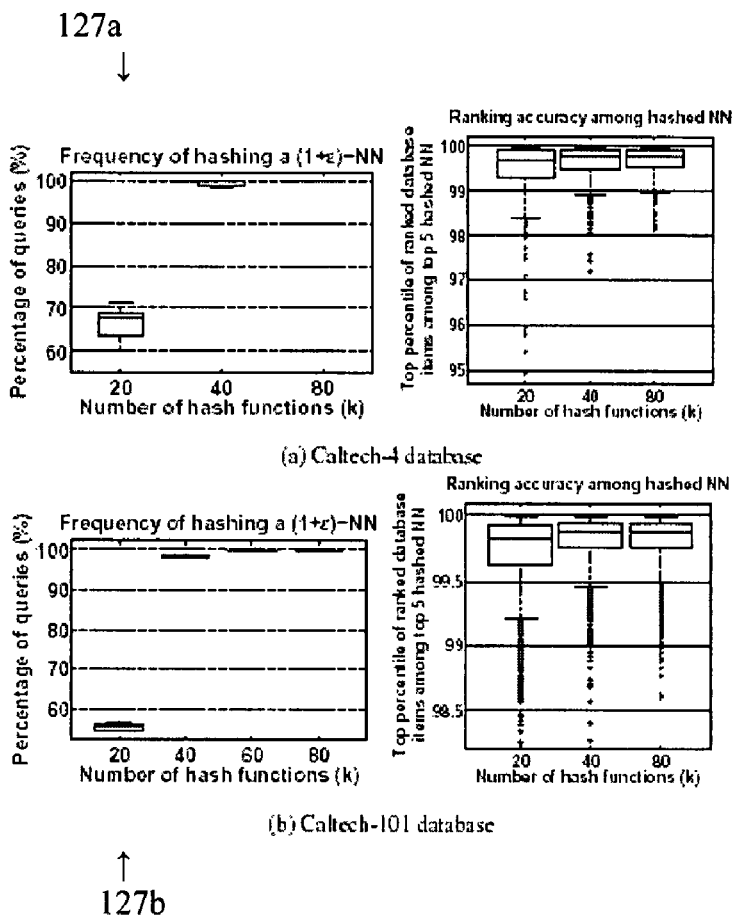
FIG. 27 shows image retrieval results for Caltech-4 and Caltech-101 databases using PMK hashing.

To measure the approximate-NN indexing accuracy (1), we measure for each data set the probability in practice that we obtain some $(1+\epsilon)$-neighbor for each query. In other words, we count how often we hash to one (or more) database hash keys that are within $(1+\epsilon)C$ of the query, if the true nearest item is at distance C from it. To measure the hash function accuracy (2), we compute the error $$Pr(h_{\vec{r}}(f(X)) = h_{\vec{r}}(f(Y))) - \left(1 - \frac{\cos^{-1}(P_\Delta(\Psi(X), \Psi(Y)))}{\pi}\right),$$

for all queries X and all database examples Y. The probability of two sets having equal hash key bits is estimated by averaging over 80 random hash functions ($\vec{r}$). The ranking quality (3) is computed in terms of the top percentile among the top K hashed NN (according to the ranking a linear scan would provide), while the relevance of hashed NN (4) is measured by the ratio of the number of top K hashed NN having the same label as the query divided by the same count for the top K NN according to a linear scan. We set K=5. All results are collected for five repeated runs, due to the random elements of the algorithm. FIG. 27 displays plotted results for both databases using metrics (1) and (3). Note that for these last two metrics, exhaustive search using the pyramid match is our baseline because the method we have described is meant to approximate the quality of such a search at a small fraction of the cost. Our implementation of the pyramid match requires on average 0.1 ms to compare two sets averaging 1400 features each, on a machine with a 2.4 GHz processor and 2 GB of memory. As described above, the performance of the pyramid match itself offers a close approximation to the optimal partial matching, and so we do not focus our results on this aspect. The Caltech-4 database contains 3188 total images spanning four different categories of objects. We withheld 20 images from each category to query the remaining images. The approximate-NN accuracy (top left plot 127a) is very strong in practice here, with nearly a 100% chance of fulfilling the $(1+\epsilon)$ guarantee when $k \geq 40$. As expected, a larger number of hash functions provides better accuracy. The distribution of errors between the hash function bit agreement and the pyramid match scores (metric 2) has a mean of −0.01 ($\sigma$=0.04), again verifying our properties for this data. The top right plot demonstrates that our hashed NN match the quality of the NN obtained with a linear scan very well, with ranking percentiles of median values of 99.8. The mean relevance ratio is 0.97 ($\sigma$=0.12) and the median ratio is 1.0 for the closest 5 neighbors. On average, a query with pyramid match hashing required searching only 79 images, or 2.5% of the database. Thus, our pyramid match hashing algorithm greatly improves the efficiency of partial match search with very little loss in accuracy over the earlier described pyramid match algorithm. The Caltech-101 database contains about 9,000 images spanning 101 object categories. Because there are only 30 images in some categories, we withheld 10 images from each class to use as queries on the rest of the database. For this data, an average query required searching only 115 images, or 1.5% of the database. The realized approximate-NN accuracy follows a similar trend as above, with nearly perfect satisfaction of the indexing guarantee for 40 hash bits or more (bottom left plot 127*b*). The mean hash function error (metric 2) is 0 ($\sigma$=0.03); this again is evidence that the relationship between the pyramid match and our hash functions holds in practice. The ranking quality of the pyramid match hashing relative to the linear scan is high on this data, with median percentiles of 99.9 for 20 to 100 hash functions (bottom right plot 127*b*). The mean ratio of relevant examples retrieved with hashing versus a linear scan is 0.76 ($\sigma$=0.4), and the median value is 1.0 for this data. This distribution is wider than it was for the Caltech-4 data, suggesting that the large number of categories makes the retrieval of all relevant examples more challenging. Still, on average 76% of relevant examples found in the top 5 NN with a linear scan are also found by the hashing retrieval. For both data sets, using more hash functions improves the indexing accuracy because it increases the probability that similar examples collide; however this accuracy comes at the cost of a linear increase in hash key computation time.

It should now be appreciated that we have developed a sub-linear time randomized hashing algorithm that enables scalable search over a normalized partial matching for very large databases. We have demonstrated our approach on retrieval tasks for images represented by sets of local appearance features, and we have analyzed its accuracy and theoretical guarantees in various ways. Nothing about the method is specific to a given representation; it can be applied in any case where it is useful to index sets of feature vectors based on their correspondence.

Having described preferred embodiments of the invention, one of ordinary skill in the art will now realize further features and advantages of the invention from the above-described embodiments. It should be understood, therefore, that the foregoing is only illustrative of the principles of the invention and that various modifications can be made by those skilled in the art without departing from the scope and spirit of the invention. Accordingly, the invention is not to be limited by what has been particularly shown and described, except as indicated by the appended claims.

We claim:

1. A method for classifying or comparing data objects comprising:
    detecting, using a computer, a first set of points of interest in a first data object and a second set of points of interest in a second data object;
    computing feature descriptors for each data object from said points of interest;
    forming a multi-resolution histogram from the feature descriptors of each data object; and
    computing a weighted intersection from the multi-resolution histogram for the first data object as compared with the multi-resolution histogram for the second data object.

2. The method as recited in claim 1 where the weight of each weighted intersection is determined by a bin size.

3. The method as recited in claim 1 wherein the forming a multi-resolution histogram comprises:
    setting a first histogram resolution level and detecting matching points in the feature descriptors of the first data object and the second data object at said resolution level to provide a set of matched points;
    changing the histogram resolution level to a second histogram resolution level and confirming existing matching points and providing a weight reflecting distance estimate between matched points in the second histogram resolution level; and
    changing again the histogram resolution level to a third histogram resolution level and confirming existing matching points and providing a weight reflecting distance estimate between matched points in the third histogram resolution level accordingly to provide an identifying feature.

4. The method as recited in claim 3 wherein each histogram resolution level is changed by a factor of two.

5. A method for assessing data objects comprising:
    characterizing, using a computer, a first data object by a set of feature vectors;
    partitioning feature space into a plurality of bins with multiple levels with the size of the bins changing at each level;
    computing a histogram over the partitioned feature space using the set of feature vectors for the first data object;
    characterizing, using a computer, a second data object by a set of feature vectors;
    computing a histogram over the partitioned feature space using the set of feature vectors for the second data object; and
    comparing the similarity of the histogram of the first data object with the histogram of the second data object to determine matching in similar feature space.

6. The method as recited in claim 5 wherein characterizing the first data object by a set of feature vectors comprises:
    detecting points of interest within the first data object that relate with the plurality of bins at each level of the feature space;
    recognizing corresponding points along the different levels of the feature space which provide feature descriptors; and
    from the feature descriptors and points of interest provide the set of feature vectors.

7. The method as recited in claim 5 wherein the partitioning of feature space is in the form of a pyramid with variable bin sizes.

8. The method as recited in claim 5 wherein the partioning feature space into a plurality of bins with multiple levels with the size of the bins changing at each level step comprises varying the bin size from a smallest bin at a finest resolution to a larger bin at each level of the feature space until at the last level the bin size encompasses the entire feature space.

9. The method as recited in claim 5 wherein the comparing the similarity of the histogram of the first data object with the histogram of the second data object step comprises comparing the histograms of the first data object and the second data object with a weighted histogram intersection computation to determine the similarity of the best partial matching between similar feature space.

* * * * *